United States Patent
Koizumi et al.

(10) Patent No.: US 7,117,223 B2
(45) Date of Patent: Oct. 3, 2006

(54) METHOD OF INTERPRETATION SERVICE FOR VOICE ON THE PHONE

(75) Inventors: Atsuko Koizumi, Sagamihara (JP); Yoshinori Kitahara, Tachikawa (JP); Yasunari Obuchi, Kokubunji (JP); Seiki Mizutani, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 10/073,903

(22) Filed: Feb. 14, 2002

(65) Prior Publication Data

US 2003/0033312 A1    Feb. 13, 2003

(30) Foreign Application Priority Data

Aug. 9, 2001   (JP)  ............................. 2001-241959

(51) Int. Cl.
G06F 17/30   (2006.01)
G10L 15/06   (2006.01)

(52) U.S. Cl. .............................. 707/102; 707/1; 707/3; 704/277

(58) Field of Classification Search ................ 704/246, 704/231, 243, 277; 379/88.01; 707/1–10, 707/104.1, 100–102; 715/513, 532
See application file for complete search history.

(56) References Cited

U.S. PATENT DOCUMENTS

| | | | | |
|---|---|---|---|---|
| 5,774,671 | A * | 6/1998 | Satoh | 709/231 |
| 5,878,423 | A * | 3/1999 | Anderson et al. | 707/100 |
| 5,879,163 | A * | 3/1999 | Brown et al. | 434/236 |
| 6,031,904 | A * | 2/2000 | An et al. | 379/201.02 |
| 6,327,346 | B1 * | 12/2001 | Infosino | 379/88.02 |
| 6,385,580 | B1 * | 5/2002 | Lyberg et al. | 704/258 |
| 6,917,920 | B1 * | 7/2005 | Koizumi et al. | 704/277 |
| 6,944,817 | B1 * | 9/2005 | Danneels | 715/513 |
| 6,961,722 | B1 * | 11/2005 | Bruecken | 707/3 |
| 2002/0169592 | A1 * | 11/2002 | Aityan | 704/2 |

FOREIGN PATENT DOCUMENTS

| | | |
|---|---|---|
| JP | 56-88564 | 7/1981 |
| JP | 58-40684 | 3/1996 |
| JP | 08-328585 | 12/1996 |
| JP | 9-65424 | 3/1997 |

OTHER PUBLICATIONS

"Fundamentals of Speech Recognition" vol. 2., L. Rabiner et al, translation supervised by Sadaki Furui, NTT Advance Technology, 1995, pp. 245-304.
"From Text to Speech", J. Alien et al, Cambridge University Press, 1987, pp. 16-150.
"Recent Situations of the Text-to-Speech Synthesis Technology", Interface, Dec. 1996, Yatou, pp. 161-165.

* cited by examiner

*Primary Examiner*—Don Wong
*Assistant Examiner*—Marc Filipczyk
(74) *Attorney, Agent, or Firm*—Mattingly, Stanger, Malur & Brundidge, P.C.

(57) ABSTRACT

An interpretation service for voice based on sentence template retrieval allows a translation database to be customized without burdening users and enables sentences needed by users to be accurately interpreted. A sentence to be stored in a translation database for customization can be described as a sentence template including a slot which allows words to be replaced. A condition for selecting sentence templates is extracted from a registered user profile (UP). A sentence template matching the condition is retrieved from those stored in the translation database for customization and is registered in a translation database customized for each user. A word extracted from the UP is inserted into the sentence template's slot for registration to a sentence dictionary customized for each user.

8 Claims, 28 Drawing Sheets

FIG.2

| | |
|---|---|
| 201 — WAVE | |
| 202 — CSTRING | |
| 203 — JAPANESE | |
| 204 — ICNT | |
| 205 — RECOGS(1) | |
| RECOGPNUM(1) | |
| RECOGSNUM(1) | |
| : | |
| RECOGS(N) | |
| RECOGPNUM(N) | |
| RECOGSNUM(N) | |
| 206 — RESULT | |
| 207 — SYNWAVE | |
| 208 — JCNT | |
| 209 — LANG | |
| 210 — SCENE | |
| 211 — BSENTENCE | |
| 212 — CSENTENCE | |
| 213 — PCAND | |
| 214 — SCAND | |
| 215 — INDEX | |
| : | |

FIG.9

| SENTENCE TEMPLATE NUMBER 2211 | SENTENCE NUMBER 2212 | TRANSLATION 2213 | |
|---|---|---|---|
| | | 1 | 2 |
| ... | ... | ... | ... |
| 3004 | 3004001 | ... | I'D LIKE TO HAVE A GLASS OF WATER. |
| 3004 | 3004002 | ... | CAN I SEE THE MENU? |
| 3004 | 3004003 | ... | I'D LIKE TO HAVE A CUP OF COFFEE. |
| 3004 | 3004004 | ... | I'D LIKE TO HAVE A SPOON. |
| ... | ... | ... | ... |

| USER ID | CHARGE |
|---------|--------|
| ⋮ | ⋮ |
| 1234 | 100 |
| 1235 | 0 |
| 1236 | 300 |
| 1237 | 850 |
| ⋮ | ⋮ |

FIG.12

| LANGUAGE NUMBER | LANGUAGE |
|---|---|
| 1 | JAPANESE→KOREAN |
| 2 | JAPANESE→ENGLISH |
| 3 | JAPANESE→CHINESE |
| 4 | JAPANESE→FRENCH |
| ⋮ | |

FIG.13

| SCENE NUMBER | SCENE |
|---|---|
| 1 | AIRPORT |
| 2 | HOTEL |
| 3 | RESTAURANT |
| 4 | HOSPITAL |

FIG.14

| SCENE NUMBER | SENTENCE TEMPLATE NUMBER | SENTENCE TEMPLATE |
|---|---|---|
| 1 | 1001 | [ ]HADOKODESUKA? |
| : | : | |
| 3 | 3001 | KONNITIHA |
| 3 | 3002 | ARIGATOU |
| 3 | 3003 | [ ]HADOKODESUKA? |
| 3 | 3004 | [ ]GAHOSIIDESU |
| 3 | 3005 | [ ]HAARIMASUKA? |
| : | : | |
| | | |

FIG.15

| | SENTENCE TEMPLATE NUMBER (2011) | SENTENCE NUMBER (2012) | SENTENCE (2013) | TIME SERIES FEATURE VECTORS (2014) |
|---|---|---|---|---|
| 2001 | 1001 | 1001001 | KONNITIHA | A11,A12,··· |
| 2002 | 1002 | 1001001 | ARIGATOU | A21,A22,··· |
| | : | : | : | : |
| 2003 | 3004 | 3004001 | MIZUGAHOSIIDESU | A31,A32,··· |
| 2004 | 3004 | 3004002 | MENYUGAHOSIIDESU | A41,A42,··· |
| 2005 | 3004 | 3004003 | KOHIGAHOSIIDESU | A51,A52,··· |
| 2006 | 3004 | 3004004 | SUPUNGAHOSIIDESU | A61,A62,··· |
| | : | : | : | : |

FIG.16

| | COMMAND NUMBER (2111) | COMMAND (2112) | TIME SERIES FEATURE VECTORS (2113) |
|---|---|---|---|
| 2101 | 1 | OK | B11,B12,··· |
| 2102 | 2 | NEXT | B21,B22,··· |
| 2103 | 3 | QUIT | : |
| | : | | B31,B32,··· |

FIG.18

| | 2811 | 2812 | 2813 | 2814 | 2815 |
|---|---|---|---|---|---|
| NAME | HITACHI | TARO | HITACHI | TARO | |
| AGE/SEX | 37 | MALE | | | |
| OCCUPATION | OFFICE WORKER | | | | |
| DESTINATION | MIAMI | | | | |
| PLACE TO STAY | FEBRUARY 12 | FEBRUARY 17 | HILL | HILL | |
| FLIGHT NUMBER | | | | | |
| PHYSICAL CONDITION | EGG ALLERGY | | | | |
| FOOD LIST | STONE CRAB | OYSTER | KEY LIME PIE | | |
| SHOPPING LIST | | | | | |
| : | | | | | |
| MEMBER OF THE PARTY | 2 | | | | |
| : | | | | | |
| NAME | HITACHI | KOTARO | | | |
| AGE/SEX | 11 MONTH | MALE | | | |

FIG. 19

| | SCENE NUMBER 1711 | SENTENCE TEMPLATE NUMBER 1712 | SENTENCE TEMPLATE 1713 | SLOT 1714 | SELECTION CONDITION FOR SENTENCE TEMPLATE 1715 | TRANSLATION TEMPLATE 1716 | GRAMMATICAL INFORMATION FOR SLOTS 1717 | PRONUNCIATION INFORMATION FOR SENTENCE TEMPLATE 1718 |
|---|---|---|---|---|---|---|---|---|
| 1701 | 1 | 1001 | [ ]HADOKO DESUKA? | <LOCATION> | | WHERE IS [ ]? | | [ ]HADOKO DESUKA? |
| 1702 | 1 | 1002 | KONOBASU HA[ ]NI IKIMASUKA? | <LOCATION> | | DOES THIS BUS GO TO [ ]? | | KONOBASU HA[ ]HE IKIMASUKA? |
| | : | | | | | | | |
| 1703 | 3 | 3004 | [ ]GAHOSII DESU | <FOOD> | | I'D LIKE [ ]. | PLURAL FORM OF COUNTABLE NOUN SINGULAR FORM OF UNCOUNTABLE NOUN | [ ]GAHOSII DESU |
| 1704 | 3 | 3005 | [ ]HA ARIMASUKA? | <FOOD> | | DO YOU HAVE [ ]? | PLURAL FORM OF COUNTABLE NOUN SINGULAR FORM OF UNCOUNTABLE NOUN | [ ]HA ARIMASUKA? |
| 1705 | 3 | 3006 | [ ]ARERUGI DESU | <FOOD> | PHYSICAL CONDITION <ALLERGY | I'M ALLERGIC TO [ ]. | PLURAL FORM OF COUNTABLE NOUN SINGULAR FORM OF UNCOUNTABLE NOUN | [ ]ARERUGI DESU |
| | : | | | | | | | |
| 1706 | 4 | 4003 | [ ]GA HIKITUKEWO OKOSIMASITA | | MEMBER OF THE PARTY <INFANT | [ ] HAS GONE INTO CONVULSIONS. | | [ ]GA HIKITUKEWO OKOSIMASITA |
| 1707 | 4 | 4004 | KOUKETUATU DESU | | PHYSICAL CONDITION < HIGH BLOOD PRESSURE. | I HAVE HIGH BLOOD PRESSURE. | | KOUKETUATU DESU |

FIG. 20

| 1811 | 1812 | 1813 | 1814 | 1815 | 1816 | 1817 | 1818 |
|---|---|---|---|---|---|---|---|
| KAKI | KAKI | KAKI | COMMON NOUN | \<FOOD\> \<LIVING THING\> | OYSTER | XCISTXER | COMMON NOUN; COUNTABLE; -S; BEGINNING WITH VOWEL |
| .. | .. | .. | .. | .. | .. | .. | .. |
| HIRU HOTERU | HIRU HOTERU | HIRU HOTERU | PROPER NOUN | \<HOTEL\> | HILL HOTEL | HILU HOUTEL | PROPER NOUN; UNCOUNTABLE; DEFINITE ARTICLE; CONSONANT |
| .. | .. | .. | .. | .. | .. | .. | .. |
| SUTON KURABU | SUTON KURABU | SUTON KURABU | COMMON NOUN | \<FOOD\> \<LIVING THING\> | STONE CRAB | STOUN KRAEB | COMMON NOUN; COUNTABLE; -S; BEGINNING WITH CONSONANT |
| .. | .. | .. | .. | .. | .. | .. | .. |
| \<HOTEL\> | | | CATEGORY | \<PLACE\> \<BUILDING\> \<AGENCY\> | | | |
| \<FOOD\> | | | CATEGORY | \<CONCRETE OBJECT\> | | | |

FIG.21

| 2911 | 2912 | 2913 | 2914 | 2915 | 2916 | 2917 | 2918 |
|---|---|---|---|---|---|---|---|
| KAKI | KAKI | KAKI | COMMON NOUN | \<FOOD\> \<LIVING THING\> | OYSTER | XCISTXER | COMMON NOUN; COUNTABLE; -S; BEGINING WITH VOWEL |
| .. | .. | .. | .. | .. | .. | .. | .. |
| HIRU HOTERU | HIRU HOTERU | HIRU HOTERU | PROPER NOUN | \<HOTEL\> | HILL HOTEL | HILU HOUTEL | PROPER NOUN; UNCOUNTABLE; DEFINITE ARTICLE; CONSONANT |
| .. | .. | .. | .. | .. | .. | .. | .. |
| SUTON KURABU | SUTON KURABU | SUTON KURABU | COMMON NOUN | \<FOOD\> \<LIVING THING\> | STONE CRAB | STOUN KRAEB | COMMON NOUN; COUNTABLE; -S; BEGINING WITH CONSONANT |
| .. | .. | .. | .. | .. | .. | .. | .. |
| \<HOTEL\> | | | CATEGORY | \<PLACE\> \<BUILDING\> \<AGENCY\> | | | |
| \<FOOD\> | | | CATEGORY | \<CONCRETE OBJECT\> | | | |

FIG.22

| SCENE NUMBER | SENTENCE TEMPLATE NUMBER | SENTENCE TEMPLATE | SLOT |
|---|---|---|---|
| 1 | 1001 | [ ]HADOKODESUKA? | HILL HOTEL |
| 1 | 1002 | KONOBASUHA[ ]NI IKIMASUKA? | HILL HOTEL |
| : | : | | |
| 3 | 3004 | [ ]GAHOSIIDESU | STONE CRAB; OYSTER |
| 3 | 3005 | [ ]HAARIMASUKA? | STONE CRAB; OYSTER |
| 3 | 3006 | [ ]ARERUGIDESU | EGG |
| : | | | |
| 4 | 4003 | [ ]GAHIKITUKEWO OKOSIMASITA | SON |
| : | | | |

FIG.23

| SENTENCE TEMPLATE NUMBER (1911) | SENTENCE NUMBER (1912) | SENTENCE (1913) | TIME SERIES OF FEATURE VECTORS (1914) |
|---|---|---|---|
| 1001 | 1001001 | HIRUHOTERUHA DOKODESUKA? | A11,A12,⋯ |
| 1002 | 1002001 | KONOBASUHAHIRU HOTERUNIIKIMASUKA? | A21,A22,⋯ |
| ⋮ | ⋮ | ⋮ | ⋮ |
| 3005 | 3005001 | SUTONKURABUHA ARIMASUKA? | A31,A32,⋯ |
| 3005 | 3005002 | KAKIHAARIMASUKA? | A41,A42,⋯ |
| 3006 | 3006001 | TAMAGOARERUGIDESU | A51,A52,⋯ |
| ⋮ | ⋮ | ⋮ | ⋮ |
| 4003 | 4003001 | MUSUKOGAHIKITUKEWO OKOSIMASITA | A61,A62,⋯ |

METHOD OF INTERPRETATION SERVICE FOR VOICE ON THE PHONE

BACKGROUND OF THE INVENTION

The present invention relates to an automatic interpretation service which translates voice uttered by a user into another language and outputs a translation result as voice. The present invention mainly concerns services using a mobile telephone capable of mobile internet access services. However, the present invention also includes voice interpretation services which perform the aforementioned operation by using normal fixed-line telephones, personal computers, mobile information terminals, etc.

Conventionally, there are broadly two types of voice translation systems. One is to translate a free input sentence. The other is to retrieve prepared sentence templates.

As a system for translating free input sentences, for example, JP-A-65424/1997 discloses the voice translation system using a voice recognition server and a wireless mobile terminal. Since free sentences are input, a variety of sentences can be translated in principle. However, high translation accuracy is hardly available, making practical usage difficult.

As a system for retrieving prepared sentence templates, JP-A-88564/1981 discloses the portable translation apparatus which displays categorized sentence templates corresponding to a scene on the screen and outputs voice for a translated sentence selected by a button operation.

SUMMARY OF THE INVENTION

U.S. patent application Ser. No. 09/81142 discloses the voice interpretation service which recognizes a voice-input template sentence from a telephone terminal and audibly outputs the translated sentence. Since interpretable sentences are limited to the prepared sample sentences, the interpretation accuracy is very high, but just general sentences can be processed.

U.S. patent application Ser. No. 09/811,560 discloses the voice interpretation service capable of personally entering sentences. Since a user needs to enter necessary sentences, this is a burden to users who intend to casually use the interpretation service while traveling abroad.

If not a good traveler, it is difficult to determine which sentences to enter.

When the interpretation service is considered as a service for overseas travelers, the language interpretation service using bilingual sentence dictionary is practical. It is necessary to limit the number of sentence templates to be entered in order to improve the voice recognition accuracy. It is an object of the present invention to accurately interpret sentence templates needed for users by customizing a translation database without troubling users.

In order to solve the problems mentioned above, the present invention aims at providing a method of interpretation service for voice on the phone characterized in that an interpretation server displays a translation database stored in the interpretation server on a screen of a mobile terminal connected via a mobile Internet access network, switches connection with the mobile terminal to connection with a telephone network upon reception of an instruction to connect to a language interpretation service from the mobile terminal, receives user voice input from the mobile terminal via the telephone network, recognizes the user voice, interprets the recognized user voice into an expression in different language, and outputs voice corresponding to the interpreted expression in different language to the mobile terminal via the telephone network, wherein the interpretation server displays questionnaire entries for user registration stored in the interpretation server on a screen of a terminal connected via an Internet access network, creates and stores a user profile based on an answer for the questionnaire entries for user registration from the terminal, customizes and stores a translation database based on the user profile, and provides a interpretation service by referencing the customized translation database.

The interpretation server displays a questionnaire about service stored in the interpretation server on a screen of a terminal of a service company whose customer is an overseas traveler connected via an Internet access network, creates a service company profile based on an answer for the questionnaire about service from the terminal, customizes and stores a translation database based on the service company profile, creates and stores an information page for the service company based on the service company profile, displays the information page for the service company on a screen of the mobile terminal, and provides an interpretation service by referencing a translation database based on the service company profile upon request for interpretation from the displayed information page for the service company.

An interpretation service is provided by using both a translation database customized based on the user (traveler) profile and a translation database customized based on the service company profile.

The method according to the present invention changes accounting processing on an accounting server connected to a communication path between the mobile terminal and the interpretation server depending on whether an interpretation service is provided by referencing a translation database customized based on the service company profile or by referencing a translation database customized based on the user (traveler) profile.

Accounting processing on the accounting server performs no accounting when an interpretation service is provided by referencing a translation database customized based on the service company profile.

These and other objects, features and advantages of the present invention will become more apparent in view of the following detailed description of the preferred embodiments in conjunction with accompanying drawings.

BRIEF DESCRIPTION OF THE DRAWINGS

FIG. 2 exemplifies a data structure of memory;

FIG. 9 exemplifies a data structure of a language translation table;

FIG. 11 exemplifies a data structure of an accounting table;

FIG. 12 exemplifies a data structure of a language list;

FIG. 13 exemplifies a data structure of a scene list;

FIG. 14 exemplifies a data structure of a translation database;

FIG. 15 exemplifies a data structure of a sentence dictionary;

FIG. 16 exemplifies a data structure of a command dictionary;

FIG. 18 exemplifies a data structure of user information;

FIG. 19 exemplifies a data structure of a translation database for customization;

FIG. 20 exemplifies a data structure of a word dictionary;

FIG. 21 exemplifies a data structure of a user's word dictionary;

FIG. 22 exemplifies a data structure of a translation database for users;

FIG. 23 exemplifies a data structure of a sentence dictionary for users;

DESCRIPTION OF THE PREFERRED EMBODIMENTS

Embodiments of the present invention will be described with reference to the accompanying drawings.

Figure 1:
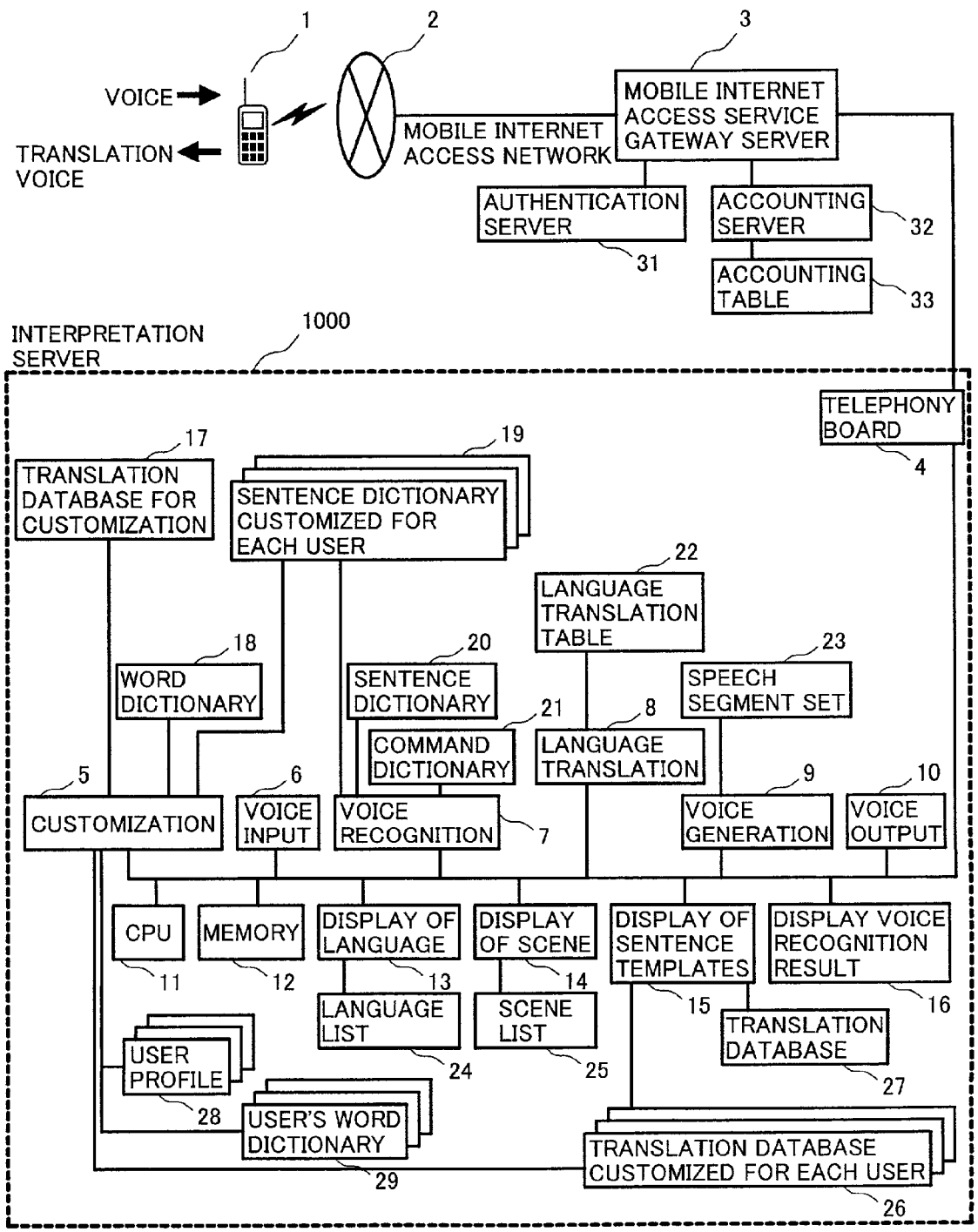
FIG. 1 shows a configuration of a Japanese-English interpretation service system according to a first embodiment of the present invention.

FIG. 1 shows an automatic interpretation service system configuration indicating the first embodiment of the present invention. The present invention relates to a voice interpretation machine. An automatic interpretation server 1000 according to this embodiment may be a personal computer, a workstation, etc. which can comply with the configuration in FIG. 1 provided with a CPU and memory. The platform type does not limit the scope of the present invention. This embodiment describes the automatic interpretation service for interpreting English into Japanese. This is an example. Languages are not limited such as interpretation from Japanese into English, or from Chinese into Japanese, and vice versa.

In FIG. 1, the reference numeral 1 represents a telephone terminal capable of using mobile internet access services, 2 a mobile Internet access network, 3 a mobile internet access service gateway server, 4 a telephony board, 5 a customization means, 6 a voice input means, 7 a voice recognition means, 8 a language translation means, 9 a voice generation means, 10 a voice output means, 11 a CPU, 12 memory, 13 a language display means, 14 a scene display means, 15 a sentence template display means, 16 a voice recognition result display means, 17 a translation database for customization, 18 a word dictionary, 19 a sentence dictionary customized for each user, 20 a sentence dictionary, 21 a command dictionary, 22 a language translation table, 23 a speech segment set, 24 a language list, 25 a scene list, 26 a translation database customized for each user, 27 a translation database, 28 a user profile, 29 a user's word dictionary, 31 an authentication server, 32 an accounting server, and 33 an accounting table.

Figure 3:
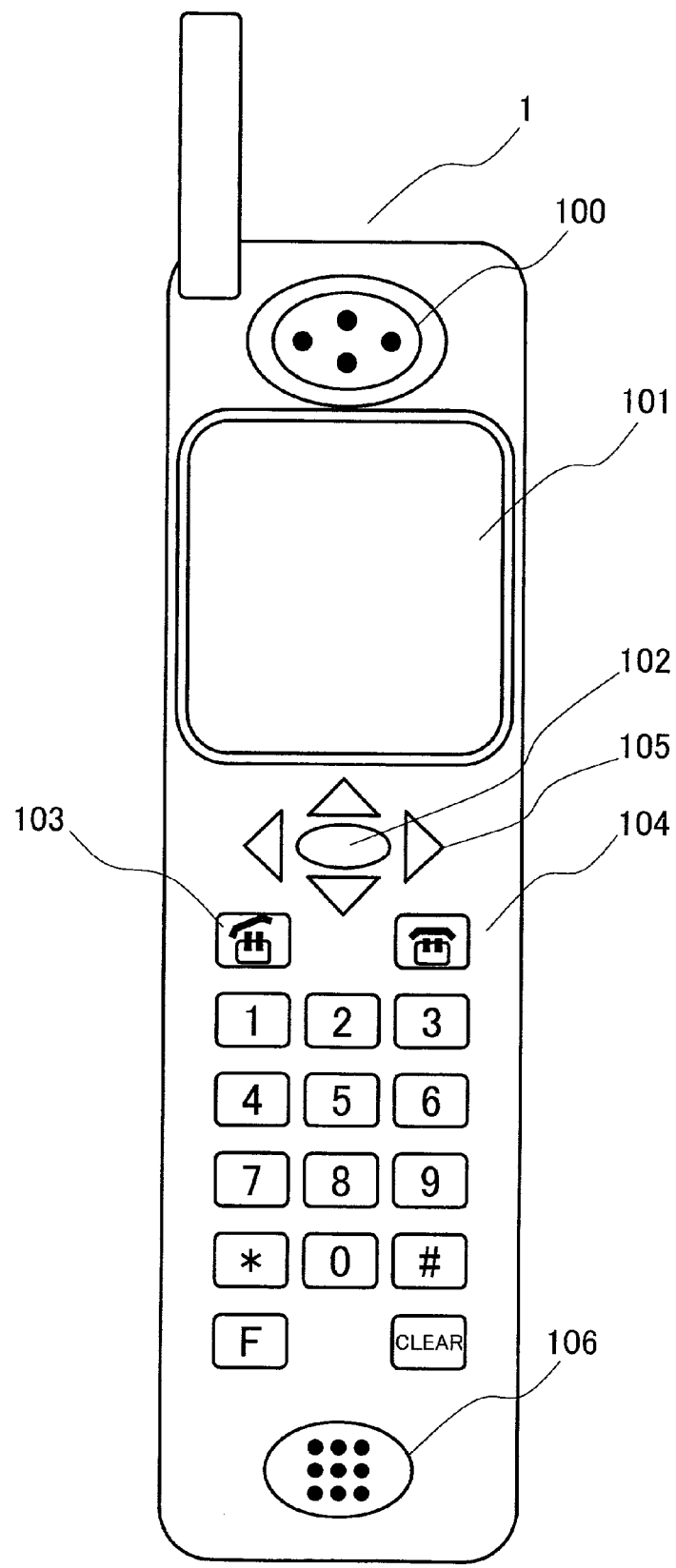
FIG. 3 exemplifies a telephone terminal.

FIG. 2 exemplifies a data structure of the memory 12. FIG. 3 shows an external view of the telephone terminal 1 capable of using mobile internet access services.

The following description assumes that the telephone terminal capable of using mobile internet access services can process voice and data by using the same protocol.

The following describes basic operations of the interpretation service for a user who will not do any customization.

Referring to FIGS. 1 and 3, a user turns on a power button 104 of the telephone terminal 1 capable of using mobile internet access services, and then presses a mobile internet access button 102. The user is connected to mobile internet access service gateway server 3 via the mobile internet access service packet network 2 (s100 in FIG. 24). The authentication server 31 confirms that the user is registered for mobile Internet access services.

Figure 24:
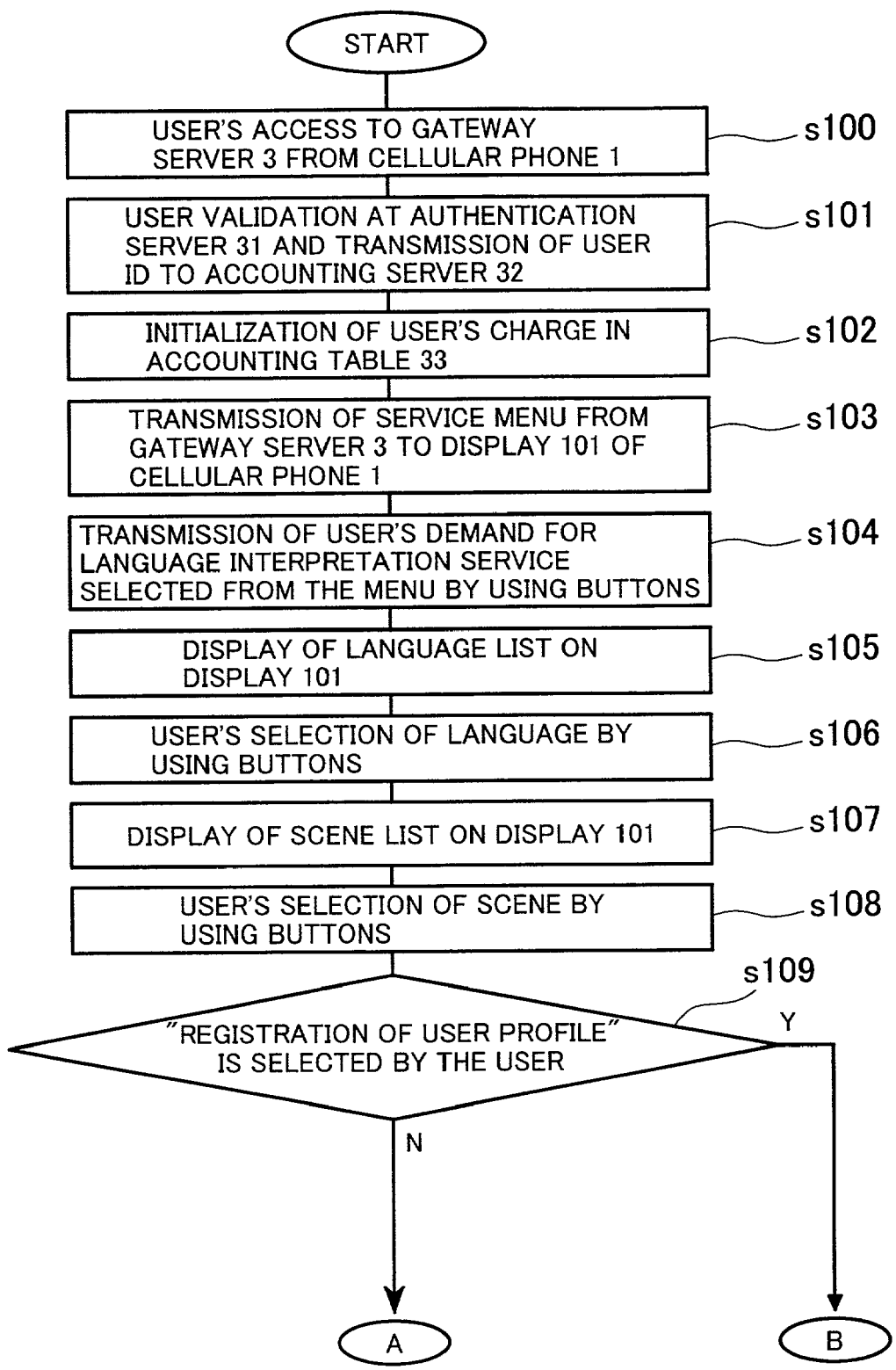
FIG. 24 is a flowchart (part 1) showing operations according to a first embodiment.

At this point, the user ID is sent to the accounting server 32 (s101 in FIG. 24). In many cases, the user ID is linked with the ID of the telephone terminal 1. There may be a method of entering a user ID in combination with a password independently of the telephone terminal 1.

The accounting server 32 includes the accounting table 33. FIG. 11 shows the data structure of the accounting table 33.

The ID transmitted from the authentication server 31 is collated with each cell in the user ID column 3311 of the accounting table 33. A matching cell for the charge column 3312 is reset to zero (s102 in FIG. 24). When the aforementioned user's user ID is "1236", this corresponds to cell 3303 containing "1236" for the user ID column 3311 in the accounting table 33, zeroing the cell corresponding to 3303 for the charge column 3312.

The mobile internet access service gateway server connects with various service servers such as the automatic interpretation server according to this embodiment via dedicated lines or with ordinary Internet networks.

It may be preferable to connect to the mobile internet access service gateway server 3 by pressing the mobile internet access button 102 as mentioned above or by entering a specified telephone number using numeric buttons.

As mentioned above, the telephone terminal 1 capable of using mobile internet access services is connected to the mobile internet access service gateway server 3. The authentication server 31 confirms that the user is registered for mobile Internet access services. Then, the mobile internet access service gateway server 3 displays a service menu as shown in FIG. 4 on the display 101 of the telephone terminal 1 (s103 in FIG. 24).

Figure 4:
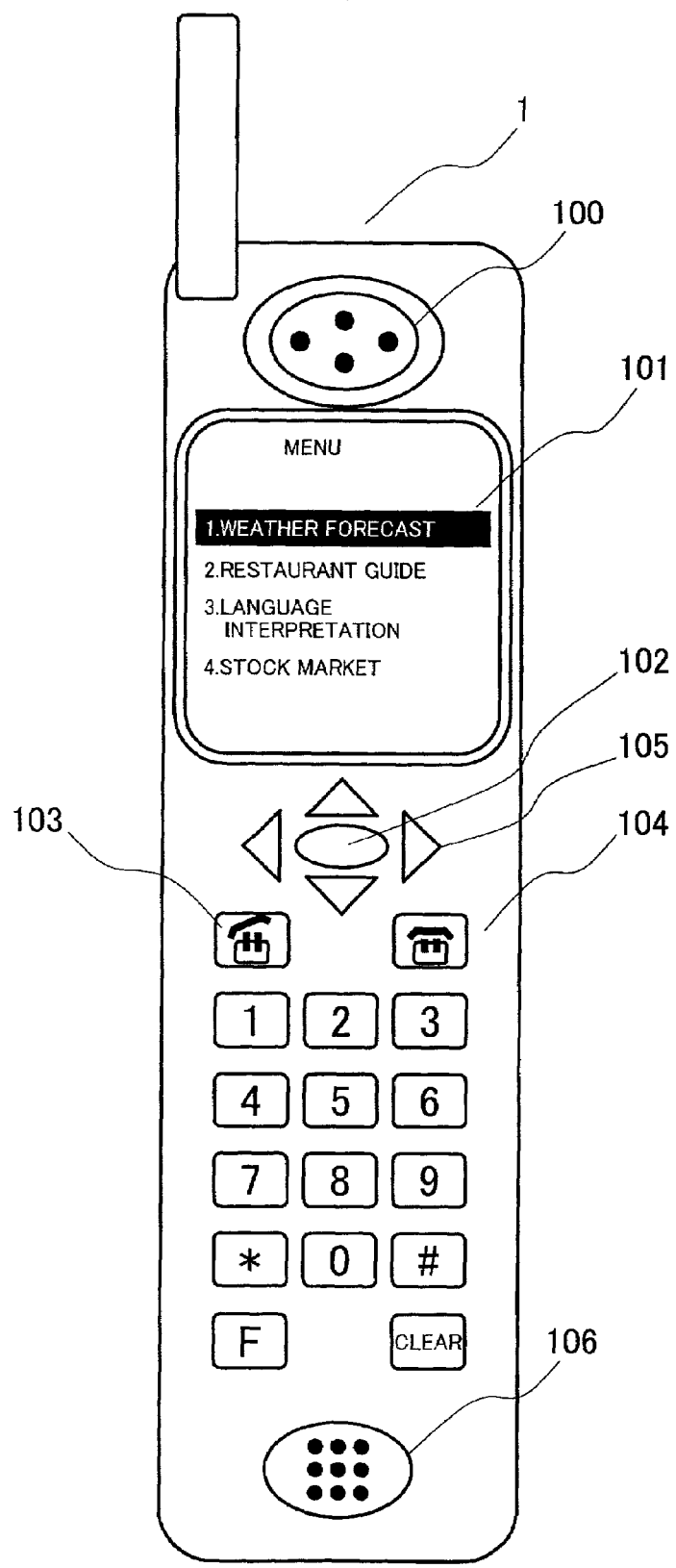
FIG. 4 shows an example of displaying a service menu on a telephone terminal display.

As shown in FIG. 4, the service menu is initially displayed with the first item inverted and indicated with brightness differing from that of the other items.

This means that the first item is selected. Obviously, the display method is not limited to black-and-white inversion and can be designed for distinction from the other items.

Referring to the service menu, the user presses a cursor control button 105 on the telephone terminal 1 to move the inverted cursor to the third item "language interpretation".

The user then presses a specified button assigned with the decision function on the telephone terminal 1 to decide the menu item (s104 in FIG. 24). In this embodiment, the mobile internet access button 102 also functions as the decision button.

Figure 5:
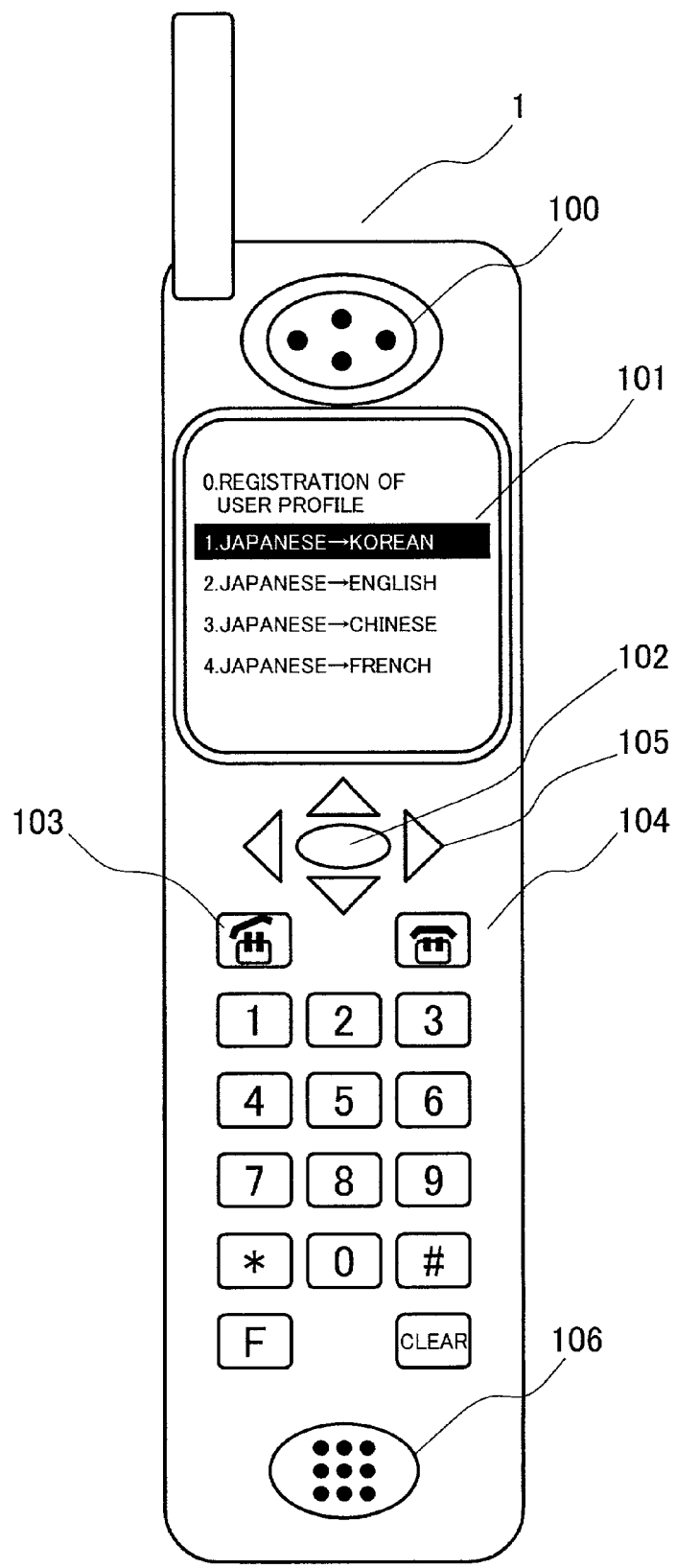
FIG. 5 shows an example of displaying interpretable languages on a telephone terminal display.

When the menu item "language interpretation" is decided, the telephone terminal 1 is connected to the automatic interpretation server 1000 via the mobile internet access service gateway server 3. Then, the language display means 13 of the automatic interpretation server 1000 is activated to display interpretable languages as shown in FIG. 5 by using the language list 24 on the display 101 of the telephone terminal 1. (s105 in FIG. 24)

The language list 24 has the data structure as shown in FIG. 12. The language display means 13 sends items of a language 2412 to the telephone terminal 1 and displays them on the display 101 of this telephone terminal 1 as shown in FIG. 5.

As shown in FIG. 5, the menu is initially displayed with the first item inverted and indicated with brightness differing from that of the other items. This means that the first item is selected. Obviously, the display method is not limited to black-and-white inversion and can be designed for distinction from the other items.

Referring to the language menu, the user presses the cursor control button 105 on the telephone terminal 1 to move the inverted cursor to the second item "Japanese→English", for example. The user then presses the decision button 102 on the telephone terminal 1 (s106 in FIG. 24).

At this time, the language display means 13 receives the cursor position on the telephone terminal 1 and stores the corresponding location number (language number) in LANG209 on the memory 12.

When the Japanese is to be interpreted into the English, number "2" is stored in LANG209 on the memory since "Japanese→English" is the second item.

Figure 6:
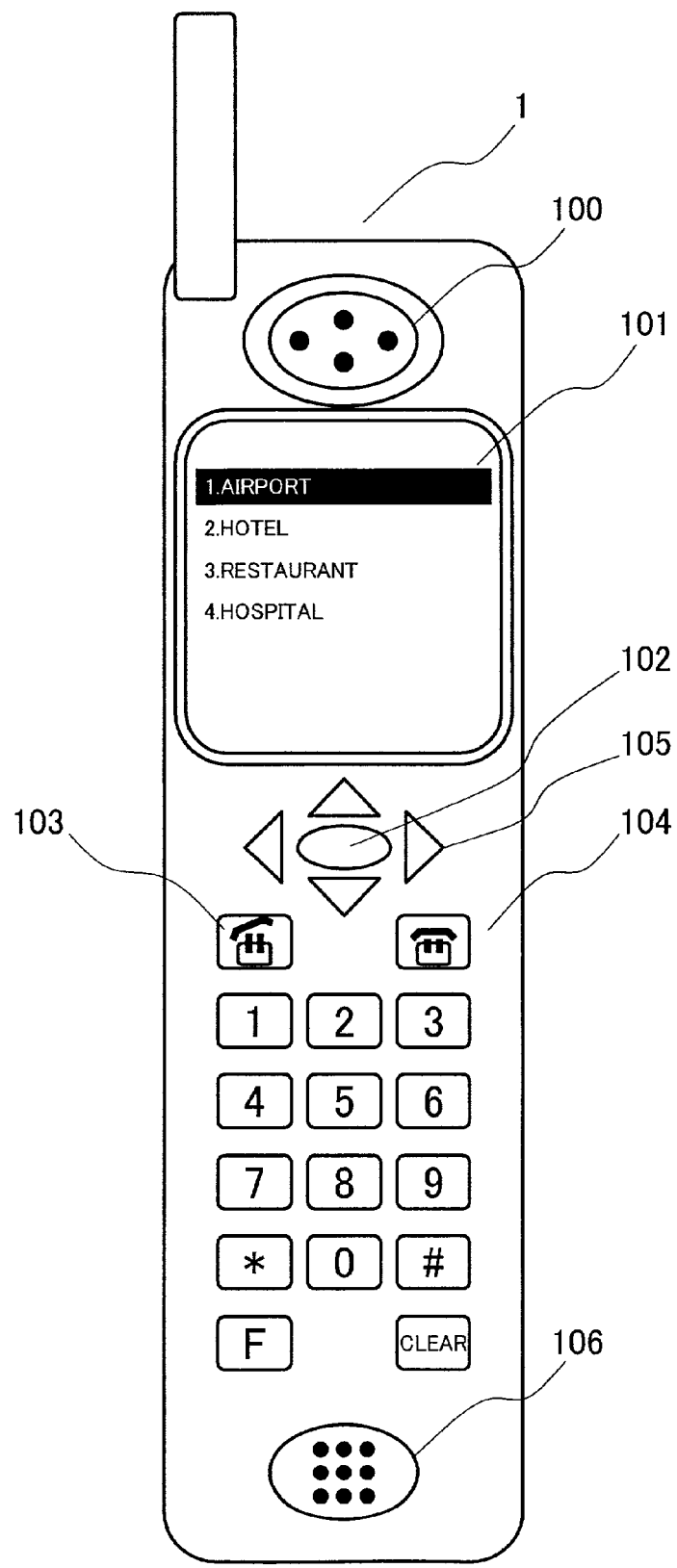
FIG. 6 shows an example of displaying interpretable scenes on a telephone terminal display.

When the language is decided, the scene display means 14 of the automatic interpretation server 1000 is activated to display interpretable scenes as shown in FIG. 6 by using the scene list 25 on the display 101 of the telephone terminal 1.

The scene here means each of situations such as "airport", "hotel", "restaurant", etc. which necessitate the use of the interpretation service according to the present invention. The scene list 25 has the data structure as shown in FIG. 13. The scene display means 14 sends items of a scene 2512 to the telephone terminal 1 and displays them on the display 101 of this telephone terminal 1 as shown in FIG. 6 (s107 in FIG. 24).

As shown in FIG. 6, the menu is initially displayed with the first item inverted and indicated with brightness differing from that of the other items. This means that the first item is selected. Obviously, the display method is not limited to black-and-white inversion and can be designed for distinction from the other items.

Referring to the scene menu, the user presses a specified button assigned with the cursor control function on the telephone terminal 1 to move the inverted cursor to the third item "restaurant", for example. The user then presses another button assigned with the decision function on the telephone terminal 1 to decide the menu item (s108 in FIG. 24).

At this time, the scene display means 14 receives the cursor position on the telephone terminal 1 and stores the corresponding location number (scene number) in SCENE210 on the memory 12. When the interpretation is needed for a restaurant scene, number "3" is stored in SCENE210 on the memory since "restaurant" is the third item.

Figure 7:
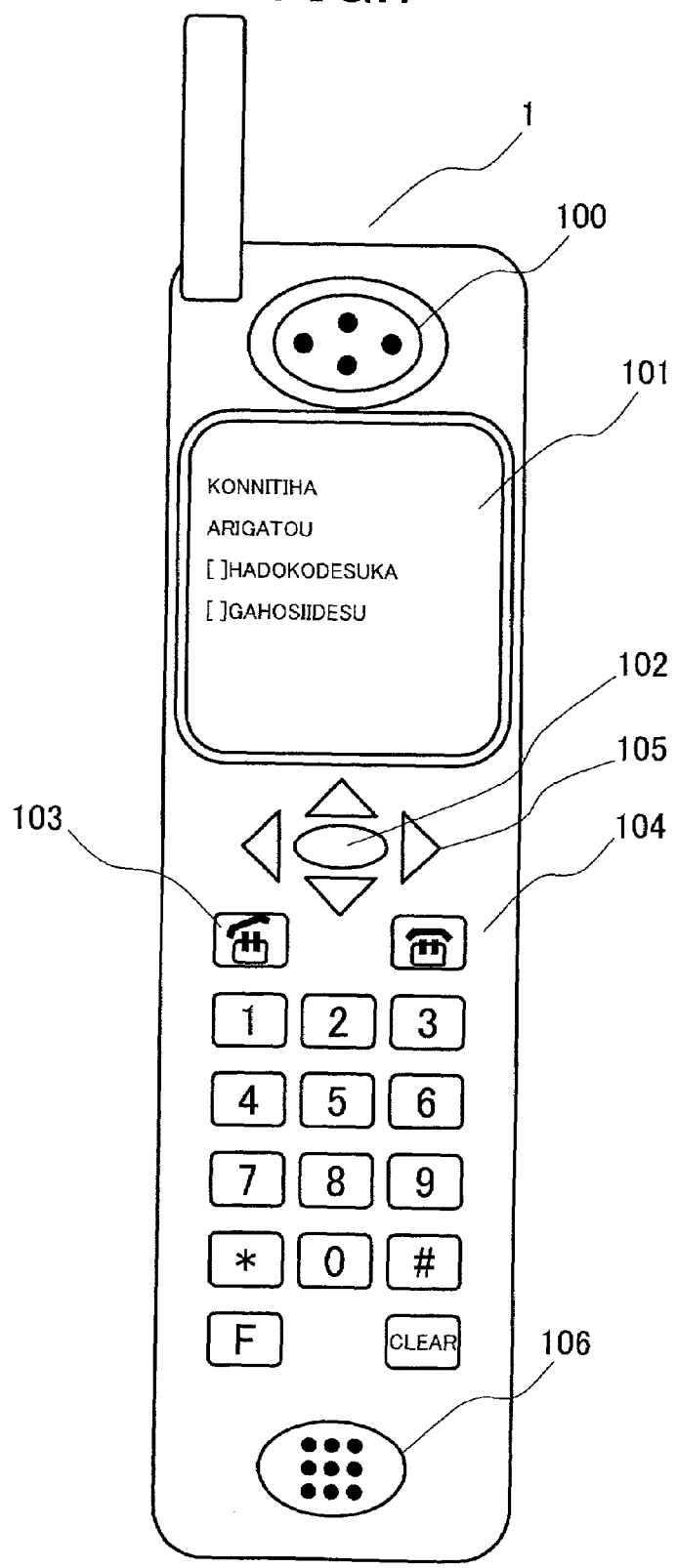
FIG. 7 shows an example of displaying interpretable sentence templates on a telephone terminal display.
Figure 25:
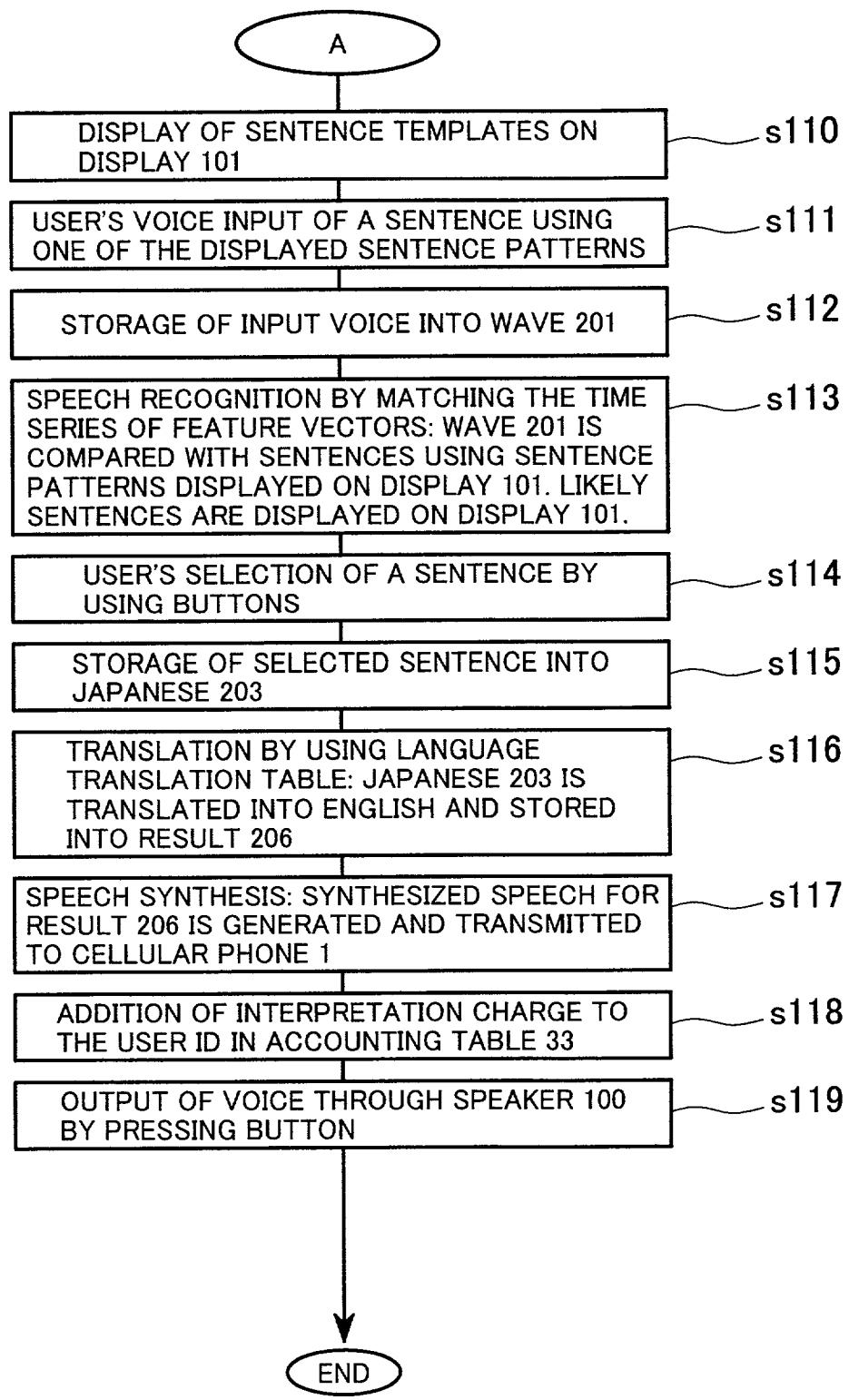
FIG. 25 is a flowchart (part 2) showing operations according to the first embodiment.

When the scene is decided, the sentence template display means 15 of the automatic interpretation server 1000 is activated to display interpretable sentence templates as shown in FIG. 7 by using the translation database 27 on the display 101 of the telephone terminal 1 (s110 in FIG. 25). At the same time, the voice input means 6 of the automatic interpretation server 1000 is activated.

The voice input means 6 then makes the system ready for voice input.

Referring to the sentence templates, the user voice inputs a sentence in Japanese to be interpreted for the restaurant scene as shown in the previous example from a microphone 106 of the telephone terminal 1 (s111 in FIG. 25). An example here is to interpret a Japanese sentence "mizugahosiidesu" into English for the restaurant scene.

The translation database 27 has the data structure as shown in FIG. 14. The sentence template display means 15 retrieves sentence templates whose scene number 2711 in the translation database 27 corresponds to a value stored in SECENE210 on the memory 12. The sentence template display means 15 then sequentially sends the matching sentence templates to the telephone terminal 1 and displays these sentence templates on the display 101 of the telephone terminal 1.

In the previous example, SCENE210 on the memory 15 contains "3". The sentence template display means 15 sends to the telephone terminal 1 the contents of a sentence template 2713 corresponding to items 2701, 2702, 2703, 2704, and 2705 assigned with value "3" for the scene number 2711 in the translation database 27 of FIG. 14. The sentence templates to be sent are "kon'nichiwa", "arigatou", "[]wadokodesuka?", "[]gahosiidesu", and "[]waarimasuka". As shown in FIG. 7, the sentence templates are sequentially displayed in units of M on the display 101 of the telephone terminal 1. Constant M is defined according to the size of the display 101. This example assumes M=4.

The displayed sentence templates contain "[]gahosiidesu". Based on this sentence template, the user voice inputs "mizugahosiidesu". Before the voice input, it may be preferable to press a specified button functioning as a trigger for voice input on the telephone terminal 1, making the voice input means 6 of the automatic interpretation server 1000 ready to be capable of voice input. Alternatively, without using the trigger such as a button, etc., it may be preferable to make the voice input available whenever after the voice input means 6 of the automatic interpretation server 1000.

Displayed sentence templates may or may not contain a slot []. The slot here means a box which can contain a word or a phrase. In the case of the sentence "[]gahosiidesu" (I'd like to have []), for example, the slot [] can contain "mizu" (water), "koohii" (coffee), "tumetaimizu" (cold water), etc.

It is possible to remarkably improve the voice recognition accuracy by displaying sentence templates and somewhat restricting sentence patterns. Further, displaying sentence templates can improve usability for users.

When sentence templates are displayed, it is important for the user to find an intended sentence template as fast as possible.

Each user can fast find an intended sentence template by customizing the translation database based on the user profile.

All recognizable sentence templates can be sequentially displayed by pressing a specified button assigned with the cursor control function.

At this time, BSENTENCE211 and ESENTENCE212 on the memory 12 store values of a sentence template number 2712 corresponding to the first and last sentence templates displayed on the display 101 of the telephone terminal 1. Namely, BSENTENCE211 corresponds to the first sentence template and ESENTENCE212 corresponds to the last one.

In the example of FIG. 7, BSENTENCE211 stores "3001" and ESENTENCE212 stores "3004".

The voice input means 6 then stores input voice in WAVE201 on the memory 12 (s112 in FIG. 25). This input voice is analog/digital converted in the telephony board 4.

The user can appropriately specify sampling rates such as 8 kHz, 11 kHz, 16 kHz, etc. for analog/digital conversion on the telephony board 4.

The user can cancel the input voice and make voice ready to be reentered by pressing a specified button assigned with the cancel function on the telephone terminal 1.

The specified button assigned with the cancel function on the telephone terminal 1, when pressed, allows the telephone terminal 1 to be capable of voice input. At this time, the telephone terminal 1 is reset to an initial state when the user presses the specified button functioning as the trigger for voice input or just after the voice input means 6 of the automatic interpretation server 1000 is activated.

Then, the voice recognition means 7 is activated.

The voice recognition means 7 reads voice data stored in WAVE201 on the memory 12 and converts the voice data to a time series of feature vectors. The voice recognition means 7 performs collation by using the sentence dictionary having time series of feature vectors for each sentence voice, recognizes the voice data, and outputs candidates.

For example, it is possible to refer to "Fundamentals of Speech Recognition—vol. 2" (L. Rabiner & B. H. Juang, translation supervised by Sadaki Furui, NTT Advance Technology, 1995, pp. 245–304) with respect to the method of recognizing voice including the method of converting voice to time series of feature vectors and the collation method.

Obviously, other voice recognition methods may be used. Voice recognition methods do not limit the present invention.

FIG. 15 shows the data structure of the sentence dictionary 20.

The voice recognition means 7 reads voice data stored in WAVE201 on the memory 12. The voice recognition means 7 then recognizes the voice by using all values of a time series of feature vectors 2014 corresponding to values of the sentence template number 2011 in the sentence dictionary 20 within the range of values stored in BSENTENCE211 and ESENTENCE212 on the memory 12.

In the previous example, BSENTENCE211 contains "3001" and ESENTENCE212 contains "3004". The voice recognition means 7 recognizes the voice by using values of the time series of feature vectors 2014 corresponding to items for values from "3001" to "3004" of the sentence template number 2011 in the sentence dictionary 20.

As a result, the aforementioned voice is converted to the sentence template numbers and the sentence numbers, e.g., corresponding to character strings "menyuugahosiidesu", "mizugahosiidesu", "koohiigahosiidesu", and "supuungahosiidesu" in the descending order of the likelihood.

For this purpose, the sentence template numbers 2011, the sentence numbers 2012, and the sentences 2013 for these candidates are stored in RECOGPNUM(1), RECOGSNUM(1) RECOGS(1), RECOGPNUM(2), RECOGSNUM(2), RECOGS(2), . . . , RECOGPNUM(N), RECOGSNUM(N), RECOGS(N) 205 on the memory 12. Here, N is the total number of items corresponding to values of the sentence template numbers 2011 in the sentence dictionary 20 within the range specified by values stored in BSENTENCE211 and ESENTENCE212 on the memory 12.

Then, the voice recognition result display means 16 is activated to send the contents of RECOGS(1), RECOGS(2), . . . , and RECOGS(M) 205 to the telephone terminal 1 and sequentially display them on the display 101 of the telephone terminal 1 (s113 in FIG. 25).

At this time, value "1" is placed in ICNT204 on the memory 12 to invert the content of RECOGS(ICNT) displayed on the display 101 of the telephone terminal 1. Constant M is defined according to the size of the display 101. This example assumes M=4.

In addition, value "0" is placed in INDEX215 on the memory 12.

When the first candidate displayed matches or approximates to the uttered content, the user presses the specified button assigned with the decision function to decide the candidate (s114 in FIG. 25). When the first candidate is an unintended one, the user presses a specified button assigned with the cursor control function to move down the black-and-white inversion field to a position displaying an intended character string on the display of the telephone terminal 1.

Namely, the value of ICNT 204 on the memory 12 is incremented each time the downward button is pressed, inverting only an area on the display of the telephone terminal 1 for displaying the content of RECOG(ICNT) on the memory 12.

When the value of ICNT204 exceeds M, value "M" is added to the value of INDEX215 on the memory 12. Next M candidates RECOGS(INDEX+1), RECOGS(INDEX+2), . . . , and RECOGS (INDEX+M) are read from the memory 12, are sent to the telephone terminal 1, and are sequentially displayed on the display 101 of the telephone terminal 1.

At this time, value "1" is placed in ICNT204 on the memory 12 to invert the nth candidate (where n is a value corresponding to ICNT) out of RECOGS(INDEX+1), RECOGS(INDEX+2), . . . , and RECOGS(INDEX+M) displayed on the display 101 of the telephone terminal 1.

Similarly, the next M candidates are sent to the telephone terminal 1 and are sequentially displayed on the display 101 of the telephone terminal 1.

FIG. 15 shows an example of the structure of the sentence dictionary 20 used for the voice recognition. Another example may be a combination of the grammar and a word dictionary. In this case, the grammar and the dictionary are used for each scene corresponding to scene numbers stored in SCENE210 on the memory 12.

Further, it may be preferable to move up the black-and-white inversion field by using an upward button to display the content backward. Namely, the value in ICNT204 on the memory 12 is decremented each time the upward button is pressed. The display 101 of the telephone terminal 1 inversely displays the nth candidate (where n is a value corresponding to ICNT) out of RECOGS(INDEX+1), RECOGS(INDEX+2), . . . , and RECOGS(INDEX+M).

When the first candidate inverted matches or approximates to the uttered content, the user presses the specified button assigned with the decision function to decide the candidate. This stores values for RECOGPNUM(INDEX+ICNT), RECOGSNUM(INDEX+ICNT), RECOGS(INDEX+ICNT) on the memory 12 in PCAND213, SCAND214, JAPANESE203 on the memory 12, respectively.

Figure 8:
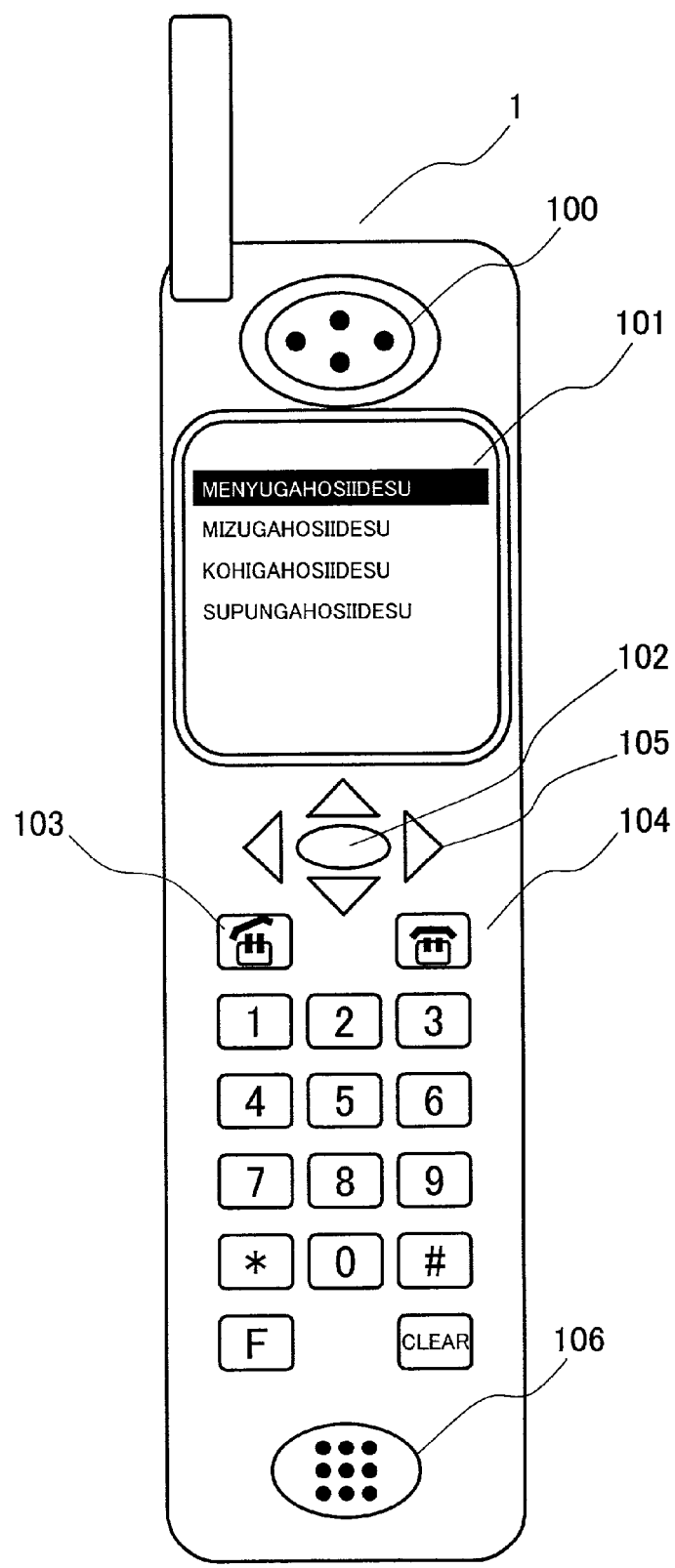
FIG. 8 shows an example of displaying recognized results on a telephone terminal display.

In the example of FIG. 8, the second line shows "mizugahosiidesu". The downward button is pressed to move the black-and-white inversion field to the second line, and then the decision button is pressed.

This places "0" in INDEX and "2" in ICONT. The values "4", "1", and "mizugahosiidesu" for RECOGPNUM(2), RECOGSNUM(2), RECOGS(2) are stored in PCAND213, SCAND214, JAPANESE203 on the memory 12, respectively (s115 in FIG. 25).

Instead of displaying voice recognition candidates on the display 101 of the telephone terminal 1 as mentioned above, the following method can be used to confirm the uttered content.

Namely, the voice recognition means 7 stores in the descending order of the likelihood the sentence template numbers 2011, the sentence numbers 2012, and the sentences 2013 in RECOGPNUM(1), RECOGSNUM(1), RECOGS(1), RECOGPNUM(2), RECOGSNUM(2), RECOGS(2), . . . , RECOGPNUM(N), RECOGSNUM(N), RECOGS(N) 205 on the memory 12. Thereafter, the voice generation means 9 is activated to store "1" in JCNT208 on the memory 12, reads RECOGS(JCNT) from the memory 12, and converts the corresponding character string to synthesized voice. The voice generation means 9 then converts wave data for the voice to analog data by means of digital/analog conversion and sends this data as voice to the telephone terminal 1 via the voice output means 10.

Conversion of character strings to synthesized voice may use the formant speech synthesis (J. Alien, M. S. Hunnicutt, D. Klatt, et al., "From Text to Speech", Cambridge University Press, 1987, pp. 16–150) . It is also possible to use the wave overlapping method (Yatou, "Recent Situations of the Text-to-Speech Synthesis Technology", Interface, December 1996, pp. 161–165). Apparently, the other text-to-speech syntheses are available.

Further, it may be preferable to record voice corresponding to an interpretable sentence template and store it in a storage apparatus such as memory.

The user listens to the transmitted voice from a speaker 100 of the telephone terminal 1. When the voice matches the content of the voice input by the user, the user presses the specified button assigned with the decision function to decide the candidate.

When the voice differs from the content of the voice input by the user, the user presses a button assigned with the function of displaying the next candidate on the telephone terminal 1.

When the user presses the button assigned with the function of displaying the next candidate on the telephone terminal 1, the voice generation means 9 in the automatic interpretation server 1000 increments JCNT208 on the memory 12. The voice generation means 9 reads RECOGS(JCNT), and converts the corresponding character string to synthesized voice. The voice generation means 9 then converts wave data for the voice to analog data by means of digital/analog conversion and sends this data as voice to the telephone terminal 1 via the voice output means 10.

Similarly to the aforementioned operations, the user listens to the transmitted voice from a speaker 100 of the telephone terminal 1. When the voice matches the content of the voice input by the user, the user presses the specified button assigned with the decision function to decide the candidate. When the voice differs from the content of the voice input by the user, the user presses a button assigned with the function of displaying the next candidate on the telephone terminal 1. The user repeats the aforementioned operations until he or she confirms the voice matching the content of the voice input by himself or herself.

Pressing the decision button stores the character string stored in RECOGS(ICNT) on the memory 12 in JAPANESE 203 on the memory 12. Instead of pressing the decision button, the user may voice input a specified word, phrase, or sentence.

The user listens to the transmitted voice from a speaker 100 of the telephone terminal 1. When the voice matches the content of the voice input by the user, the user voice inputs a specified word, phrase, or sentence representing a match as decision voice from a microphone 106 on the telephone terminal 1. When the voice differs from the content of the voice input by the user, the user voice inputs a specified word, phrase, or sentence different from that for a match as non-decision voice from the microphone 106 on the telephone terminal 1. The voice recognition means 7 in the automatic interpretation server 1000 recognizes the voice in the same manner as the aforementioned sentence input. When all the likelihood values are smaller than the predetermined threshold value or the value for ICNT204 exceeds N, the voice recognition means 7 starts collation with the command dictionary 21.

FIG. 16 shows the data structure of the command dictionary 21.

The time series of feature vectors for the input voice are collated with those for each item in the command dictionary 21. A command is identified with a command number for the candidate with the highest likelihood.

Here, it is assumed that the user voice inputs "OK". The recognition using the sentence dictionary 20 causes the likelihood value to be smaller than the predetermined threshold value during collation between the feature vector of the voice and that of each item. Feature vectors are collated with each other for items in the command dictionary 21, causing the item for 2101 to be a recognition candidate.

When the command number for that item is 1, it corresponds to the voice input representing "OK". If this is the decision voice, the voice recognition means stores a character string stored in RECOGS(ICNT) on the memory 12 in JAPANESE 203 on the memory 12.

When non-decision voice is detected, the voice generation means 9 increments JCNT208 on the memory 12, reads RECOGS(JCNT), and converts the corresponding character string to synthesized voice. The voice generation means 9 then converts wave data for the voice to analog data by means of digital/analog conversion and sends this data as voice to the telephone terminal 1 via the voice output means 10. This operation is repeated until the decision voice is recognized.

Then, the language translation means 8 in the automatic interpretation server 1000 is activated.

The language translation means 8 uses a language translation table 22 to translate a character string stored in JAPANESE 203 on the memory into another language.

The following describes operations of the language translation means 8.

FIG. 9 shows the data structure of the language translation table 22.

The language translation means 8 sequentially collates values stored in PCAND213 and SCAND214 on the memory 12 with items for sentence template numbers 2211 and sentence numbers 2212 in the language translation table 22. The language translation means 8 stores the content of the column corresponding to a value of LANG209 in the translation 2213 for the matching item in RESULT 206 on the memory 12 (s116 in FIG. 25).

In the previous example, PCAND213 and SCAND214 store values "3004" and "3004001", respectively, causing a match with item 2201 "mizugahosiidesu".

Since LANG209 contains value "2", the language translation means 8 stores the corresponding translation 2213 "I'd like to have a glass of water" in RESULT 206 on the memory 12.

The translation method is not limited to the use of the language translation table as mentioned above. For example, it may be preferable to use translation methods by using the sentence template database JP-328585/1996 or the syntax analysis JP-40684/1996.

Figure 10:
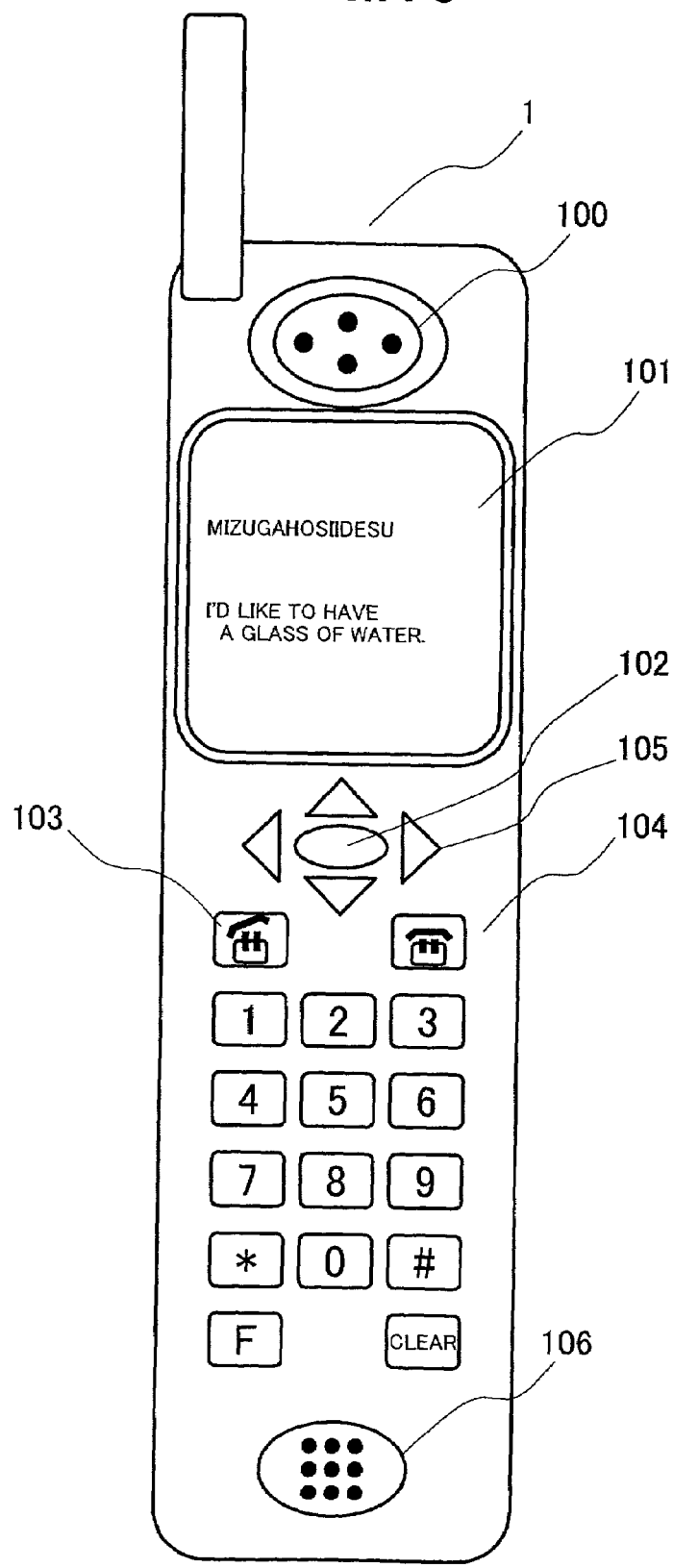
FIG. 10 shows an example of displaying an interpretation result on a telephone terminal display.

As shown in FIG. 10, the language translation means 8 displays the contents stored in JAPANESE 203 and RESULT 206 from the memory 12 on the display 101 of the telephone terminal 1. FIG. 10 shows just an example of display methods. A manner of displaying data does not limit the scope of the present invention.

Then, the voice generation means in the automatic interpretation server 1000 is activated.

The voice generation means 9 reads a character string stored in RESULT 206 from the memory 12, converts the character string to synthesized voice, and stores the wave data in SYNWAVE 207 on the memory 12. For converting character strings to synthesized voice, for example, it is possible to use the formant speech synthesis (J. Alien, M. S. Hunnicutt, D. Klatt, et al., "From Text to Speech", Cambridge University Press, 1987, pp. 16–150) and the wave overlapping method (Yatou, "Recent Situations of the Text-to-Speech Synthesis Technology", Interface, December 1996, pp. 161–165). Apparently, the other text-to-speech syntheses are available.

Further, it may be preferable to record voice corresponding to each English translation and store that voice, as is or compressed, in a storage apparatus such as memory.

The voice generation means 9 then converts wave data for the translation voice stored in SYNWAVE 207 on the memory 12 to analog or packet data and transmits this data as voice to the telephone terminal 1 via the voice output means 10. The transmitted translation voice is stored in the memory of the telephone terminal 1 (s117 in FIG. 25).

Translation voice output from the voice output means 10 may be stored in the memory 12 of the automatic interpretation server 1000 instead of storing that voice in the memory of the telephone terminal 1.

At this time, a specified charge for one-time translation is added to the content of the charge column 3312 corresponding to an ID cell sent from the authentication server 31 for the user ID column 3311 in the accounting table 33 (s118 in FIG. 25).

For example, suppose that the specified charge is 50 yen per translation. Since the previous example uses the user ID "1236", value "50" is placed in the cell for the charge column 3312 corresponding to cell 3303 which contains "1236" for the user ID column 3311 in the accounting table 33. This charge may be specified on a translation service basis or may be fixed for a plurality of translation services.

Upon completion of the service, each user with the corresponding ID is demanded to pay the accumulated charge.

Of the charge, a specified amount such as a commission is paid to an owner of the mobile internet access service gateway server 3. The remaining amount is paid to an owner of the automatic interpretation server 1000.

This is an example of distributing the charge and specifying destinations of the distributed charge. These factors can be specified depending on situations.

When the user presses a button assigned with the translation output function on the telephone terminal 1, the translation voice is read from the memory of the telephone terminal 1 and is output from the speaker 100 of the telephone terminal 1 (s119 in FIG. 25).

Each time the user presses the button assigned with the translation output function on the telephone terminal 1, the translation voice is read from the memory of the telephone terminal 1 and is output from the speaker 100 of the telephone terminal 1.

The following describes customization operations when a user registers user profile.

Figure 17:
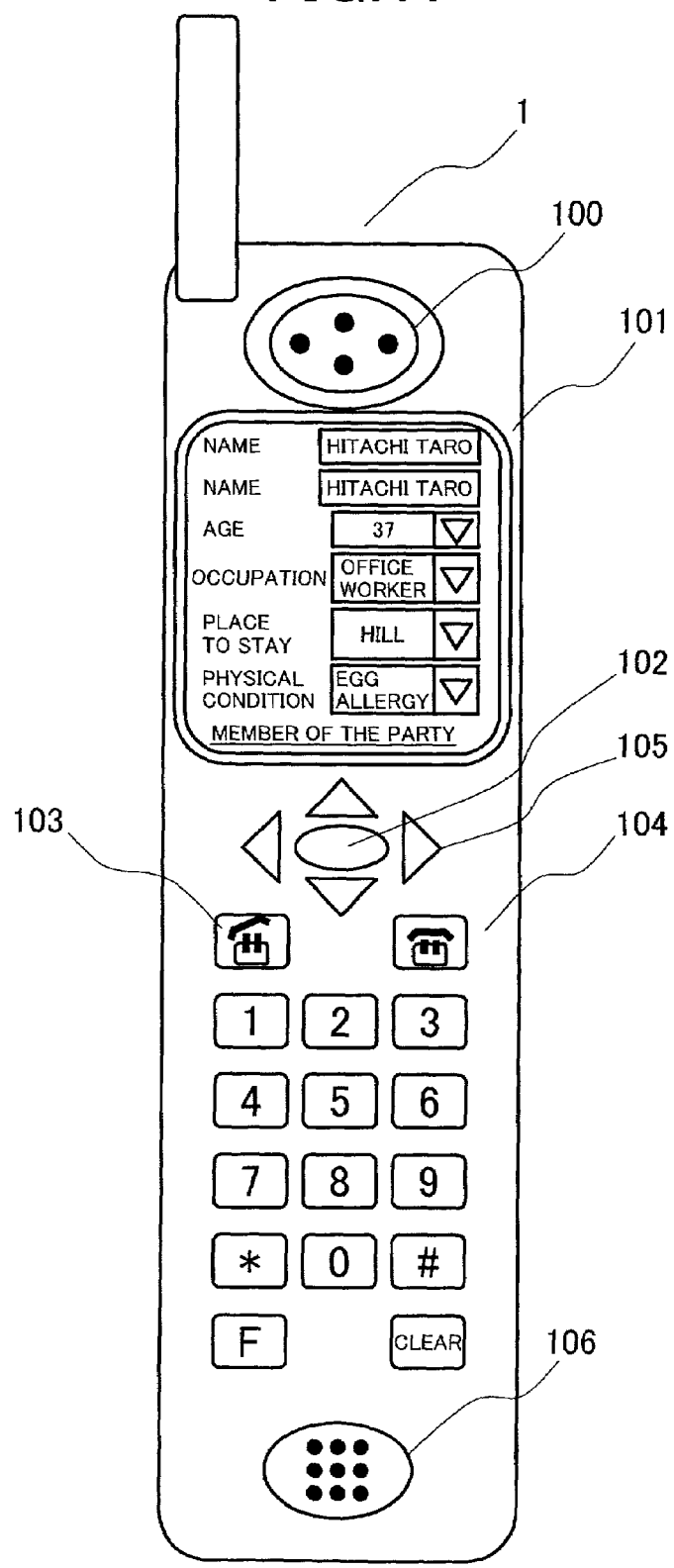
FIG. 17 shows an example of displaying a questionnaire on a telephone terminal display.

The customization means 5 is activated when the user selects item 0 "user profile registration" from the screen for selecting languages on the display 101 of the telephone terminal 1. The display 101 of the telephone terminal 1 displays a questionnaire as shown in FIG. 17 (s120 in FIG. 26).

When the user profile 28 already registers the user profile, the questionnaire shows the currently registered information.

The user uses the cursor control button 105 on the telephone terminal 1 to move the cursor and select a corresponding answer from the pull-down menu.

It may be preferable to select one of a plurality of answers by clicking a corresponding radio button instead of using the pull-down menu. With respect to some information such as "name", numeric buttons are used to enter characters in a blank area. In the example of FIG. 17, the user enters a name and selects the age, occupation, destination, and physical condition from pull-down menus.

Clicking "member of the party" displays a similar questionnaire about a traveling companion.

Figure 26:
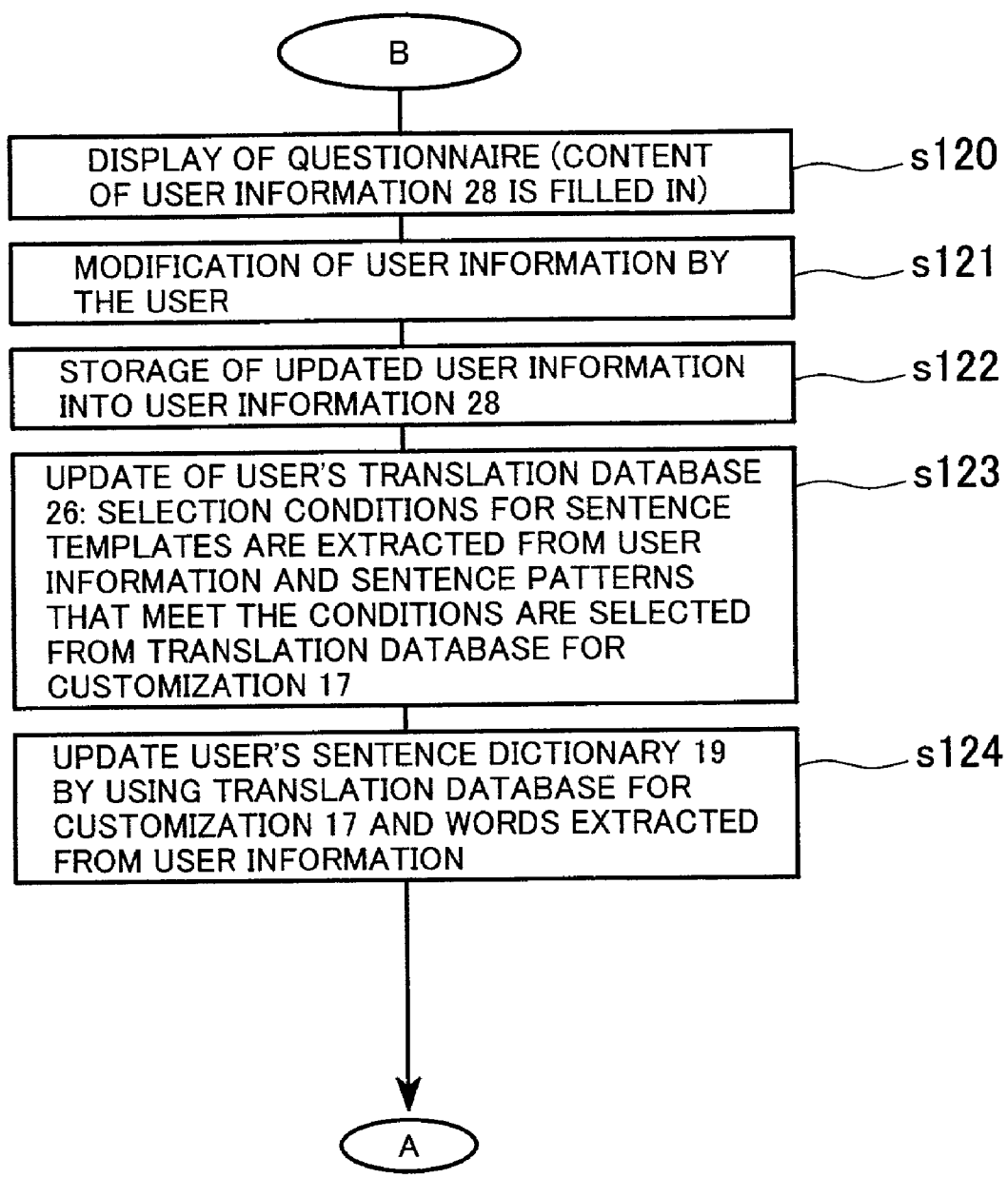
FIG. 26 is a flowchart (part 3) showing operations according to the first embodiment.

When all the information is input and the decision button 102 is pressed (s121 in FIG. 26), the input information is stored in the user profile 28 (s122 in FIG. 26).

The user profile 28 has the data structure as shown in FIG. 18.

The user profile may be registered via an Internet access network. Alternatively, it may be preferable to allow the user to fill in a paper form and a translation service company to enter the user profile into a computer. In the case of a travel package, a travel agency may act as an intermediary and arrange an interpretation service as part of the package or an option. In this case, the travel agency may register the user profile based on the contents of the package and the description filled in the application form.

When the user profile 28 is updated, the customization means 5 extracts sentence template selection conditions and user words from the user profile 28. By referencing a translation database for customization 17 and a word dictionary 18, the customization means 5 creates a user's word dictionary 29, a translation database customized for each user 26, and a sentence dictionary customized for each user 19.

The translation database for customization 17 has the data structure as shown in FIG. 19. Each sentence template is provided with a scene number 1711, a sentence template number 1712, a sentence template 1713, a slot information 1714, a selection condition for sentence template 1715, a translation template 1716, grammatical information for slots 1717, and pronunciation information for sentence template 1718.

The word dictionary 18 has the data structure as shown in FIG. 20. Each word is provided with a Japanese index 1811, Japanese pronunciation 1812, pronunciational information 1813, Japanese grammatical information 1814, a category code 1815, translation 1816, pronunciational information for translation 1817, and grammatical information for translation 1818.

The user's word dictionary 29 has the data structure as shown in FIG. 21. Like the word dictionary 18, each word is provided with a Japanese index 2911, Japanese pronunciation 2912, pronunciational information 2913, Japanese grammatical information 2914, a category code 2915, translation 2916, pronunciational information for translation 2917, and grammatical information for translation 2918.

The translation database customized for each user 26 has the data structure as shown in FIG. 22. Each sentence template is provided with a scene number 2611, a sentence template number 2612, a sentence template 2613, and slot information 2614.

The sentence dictionary customized for each user has the data structure as shown in FIG. 23. Each sentence is provided with a sentence template number 1911, a sentence number 1912, a sentence 1913, and a time series of feature vectors 1914.

During customization, the customization means 5 first extracts word information contained in the user profile 28 from the word dictionary 18 to create the user's word dictionary 29.

Then, out of sentence templates stored in the translation database for customization 17, the customization means 5 selects a sentence template matching the sentence template selection condition extracted from the user profile 28 (s123 in FIG. 26).

For example, based on the user profile "physical condition: egg allergy", the customization means 5 selects sentence template "[]arerugiidesu" with sentence template number 3006 and stores this sentence template in the translation database 26.

Further, the customization means 5 uses words contained in the user's word dictionary 29 and a sentence template stored in the translation database for customization 17 to generate a sentence for user voice recognition. The customization means 5 then stores this sentence in the sentence dictionary customized for each user 19 (s124 in FIG. 26).

When the category code for a word included in the user's word dictionary 29 matches the slot information for the sentence template, the customization means 5 inserts that word into the sentence template's slot to create a new sentence.

For example, the user profile registers "sutoonkurabu" (stone crab) as a food the user wants to eat. The customization means 5 inserts "sutoonkurabu" into the slot of the sentence template "[]wa arimasuka?" to create a sentence "sutoonkurabu wa arimasuka?" and stores it as sentence 1913 in the sentence dictionary customized for each user 19.

It may be preferable that an interpretation service company prepares a word list of local specialties, etc. for travel destinations and registers "sutoonkurabu", a special product of Florida, according to the destination "Miami" registered in the user profile.

The pronunciational information 1813 is inserted into the slot for the pronunciation information for sentence template 1718. This is converted to a time series of feature vectors and is stored in the time series of feature vectors 1914 in the sentence dictionary customized for each user 19.

Finally, it is checked if the created sentence is included in the sentence dictionary 20. If not, a translated sentence is created and is registered in the language translation table 22 with a new sentence number. A translated sentence is created by inserting the translation 1816 into the slot of the translation template 1716. The grammatical information for slots 1717 may describe grammatical characteristics (article, singular or plural form, etc.) of the translated word inserted into the slot. In this case, the translated word is inflected with reference to the grammatical information for translation 1818 in the user's word dictionary and then is inserted into the slot.

The translation template "Do you have []?" for the sentence "[]wa arimasuka?" is provided with the grammatical information for slots, i.e., "plural form of countable noun; singular form of uncountable noun".

Accordingly, a countable noun "stone crab" is inserted into that slot as a translation for "sutoonkurabu", the plural form is used.

Thus, the sentence "sutoonkurabu wa arimasuka?" is translated into "Do you have stone crabs?"

The aforementioned processing updates the translation database customized for each user 26 for displaying sentence templates, the sentence dictionary customized for each user 19 for voice recognition, and the language translation table 22 for translation and voice output of a translated sentence.

This embodiment beforehand creates a sentence comprising the sentence template embedded with a user word and the corresponding translated sentence. The user's word dictionary 28 becomes unnecessary after the customization and can be deleted.

However, the user's word dictionary 28 must be undeleted when an interpretation service provides the voice recognition or translation by combining sentence templates and the user's word dictionary.

For a user who registers the user profile, the sentence template display includes the content of the translation database customized for each user 26 and the content of the translation database 27.

Since there are already displayed sentence templates in the translation database customized for each user 26, the user can fast locate an interested sentence template.

Alternatively, it may be preferable to specify a frequently used sentence template to be a basic sentence template out of those registered in the translation database 27 and display the basic sentence template, a user's sentence template, and other sentence templates in this order.

The voice recognition uses the sentence dictionary customized for each user 19 and the sentence dictionary 20. The sentence dictionary customized for each user takes precedence.

In the restaurant scene, there can be many words to be placed in the slot for the sentence template "[]wa arimasuka?". It is impossible to register too specific a word in the sentence dictionary commonly used by all users. A large dictionary containing such a sentence as "sutoonkurabu wa arimasuka?" degrades the recognition accuracy.

Only sentences needed for a user can be subject to the voice recognition just by registering travel destinations or interested foods as the user profile.

The flowcharts in FIGS. 24, 25, and 26 show the above-mentioned operations.

In the aforementioned first embodiment, an interpretation service company provides individual users with services.

In the second embodiment described below, a travel agency provides travelers with an interpretation service as well as sightseeing information on consignment by restaurants, shops, tourist facilities, etc.

Figure 27:
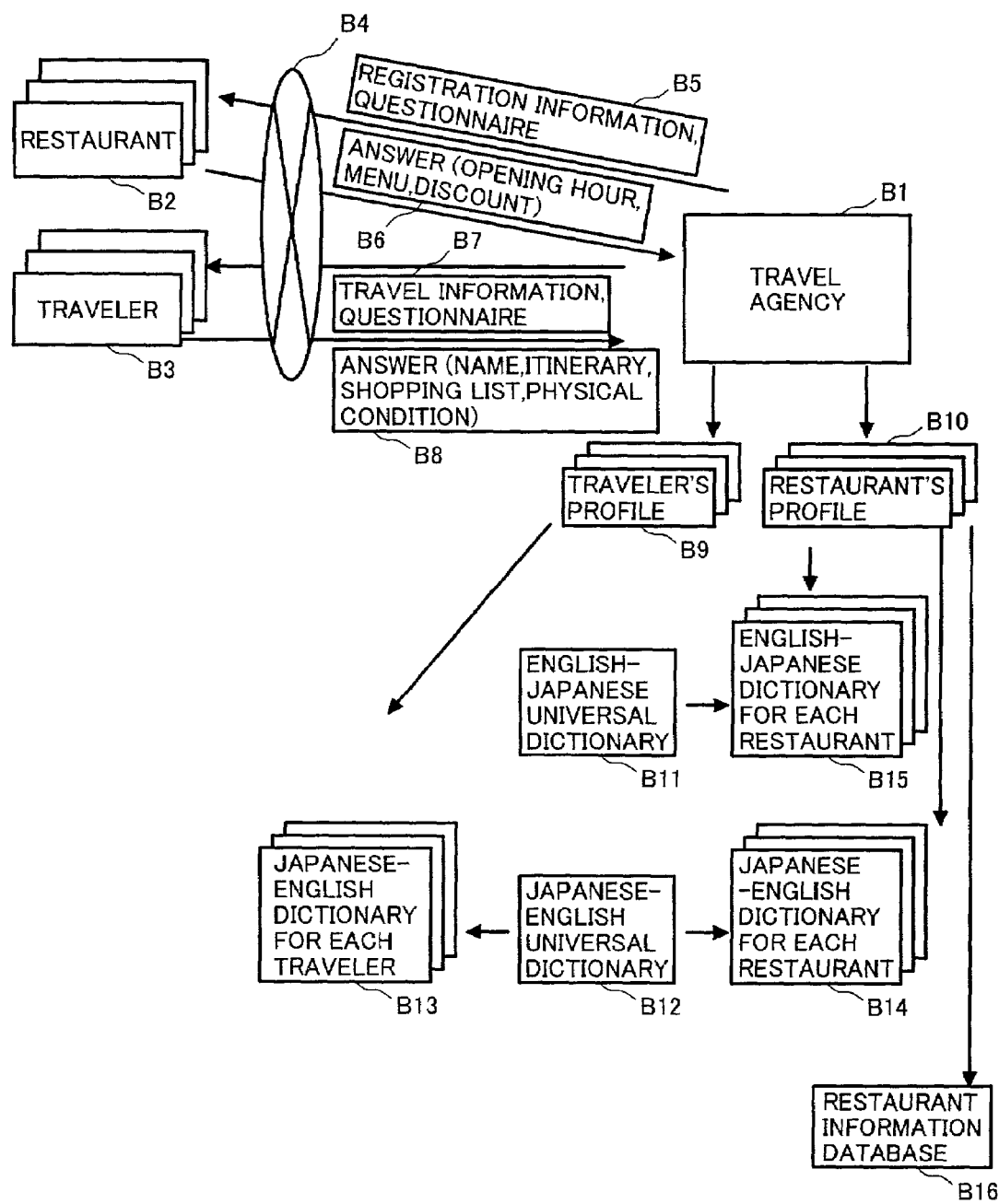
FIG. 27 shows a flow of data for customization according to a second embodiment of the present invention.

FIG. 27 shows a flow of data for customization.

A travel agency B1 provides registration information and questionnaire B5 to companies such as restaurants, shops, facilities, etc. via an Internet access network B4.

When a restaurant B2 returns an answer B6 containing information such as opening hours, menu, discounts, the travel agency B1 creates a profile B10 about the restaurant B2 and adds a page for the restaurant B2 to a restaurant information database B16.

Information in the restaurant information database B16 is to be provided for mobile terminal users from a restaurant information menu in mobile Internet access services.

The travel agency B1 provides travelers with travel information and questionnaire B7 via the Internet access network B4.

When a traveler B3 returns an answer B8 containing information such as a name, itinerary, interested foods, a shopping list, the travel agency B1 creates a profile B9 for the traveler B3.

The travel agency B1 then creates an English-Japanese dictionary for each restaurant B15 based on the profile B10 for the restaurant B2 and an English-Japanese universal dictionary B11.

Here, "dictionaries" signify databases used for an interpretation service and are equivalent to the translation database, the sentence dictionary, and the word dictionary according to the first embodiment.

The English-Japanese universal dictionary B11 is used for translating sentences into Japanese so that a speaker of English can use these sentences during interaction with customers. The English-Japanese dictionary B15 for the restaurant B2 contains a vocabulary and sentence templates customized for employees of the restaurant B2. The customization method is described in the first embodiment.

The profile B10 for the restaurant B2 is used to create a Japanese-English dictionary B14 for customers of the restaurant B2 based on a Japanese-English universal dictionary B12. The Japanese-English universal dictionary B12 is used for translating sentences into English so that a speaker of Japanese can use these sentences during travels abroad. The Japanese-English dictionary B14 for the restaurant B2 contains a vocabulary and sentence templates customized for customers of the restaurant B2.

A Japanese-English dictionary B13 for the traveler B3 is created based on the answer B8 from the traveler B3 and the Japanese-English universal dictionary B12.

The customization is thus complete.

Figure 28:
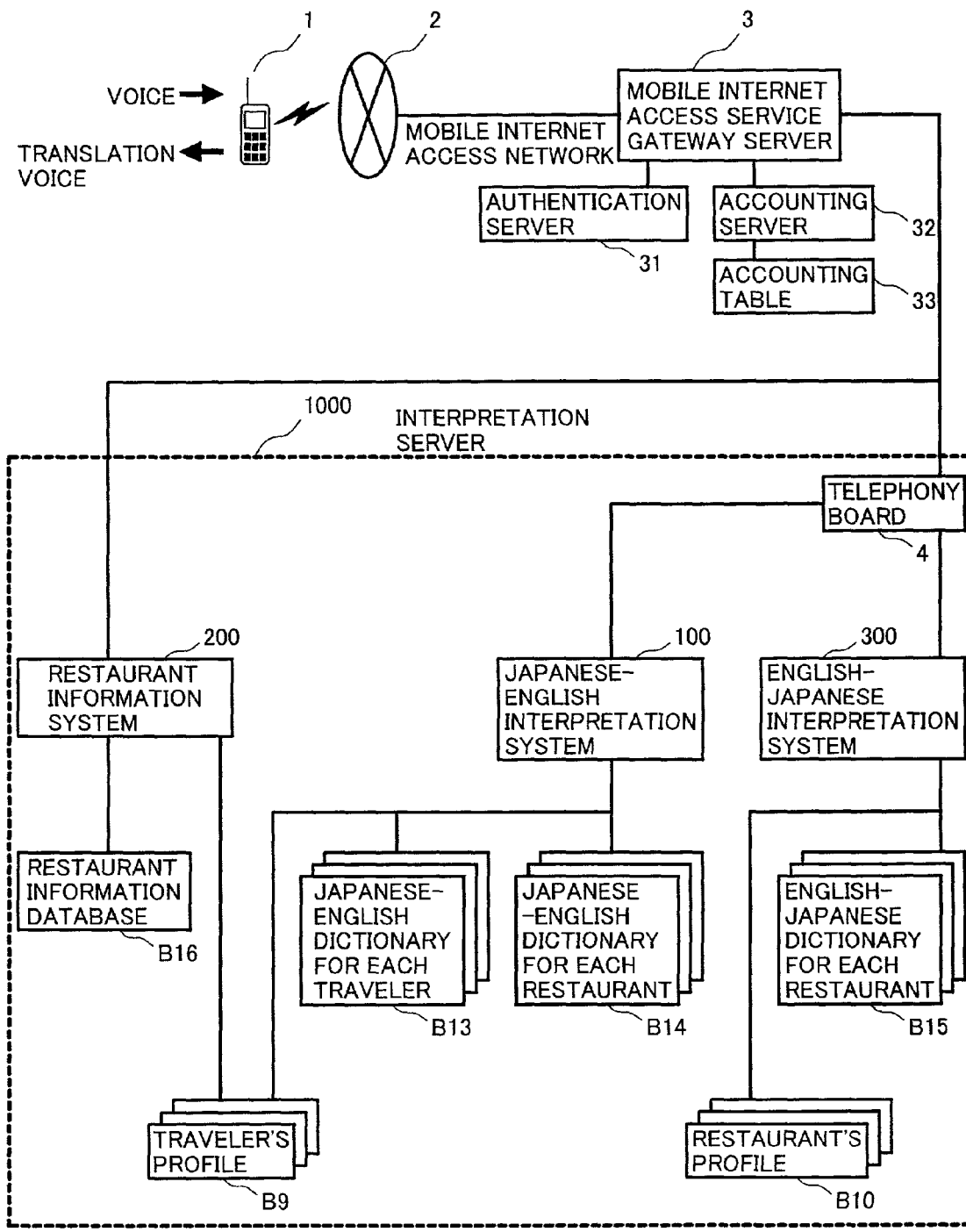
FIG. 28 shows a configuration of a Japanese-English interpretation service system indicating the second embodiment of the present invention.

FIG. 28 shows the system configuration when a user uses the service.

In FIG. 28, the reference numeral 1 denotes a telephone terminal capable of using mobile internet access services, 2 a mobile Internet access network, 3 a mobile internet access service gateway server, 4 a telephony board, 100 a Japanese-English interpretation system, 200 a restaurant information system, 300 an English-Japanese interpretation system, B9 a traveler's profile, B10 a restaurant's profile, B13 a Japanese-English dictionary for each traveler, B14 a Japanese-English dictionary for each restaurant, B15 an English-Japanese dictionary for each restaurant, B16 a restaurant information database, 31 an authentication server, 32 an accounting server, and 33 an accounting table.

A traveler accesses the mobile internet access service gateway server 3 from the telephone terminal 1 capable of using mobile internet access services. When the authentication server 31 confirms that the traveler is a registered user of the mobile Internet access service, the mobile internet access service gateway server 3 displays a service menu as shown in FIG. 4 on the display 101 of the telephone terminal 1.

Referring to the service menu, the traveler presses the cursor control button 105 on the telephone terminal 1 to move the inverted cursor to the second item "restaurant guide". The traveler then presses a specified button assigned with the decision function on the telephone terminal 1 to decide the menu item. In this embodiment, the mobile internet access button 102 also functions as the decision button.

Figure 29:
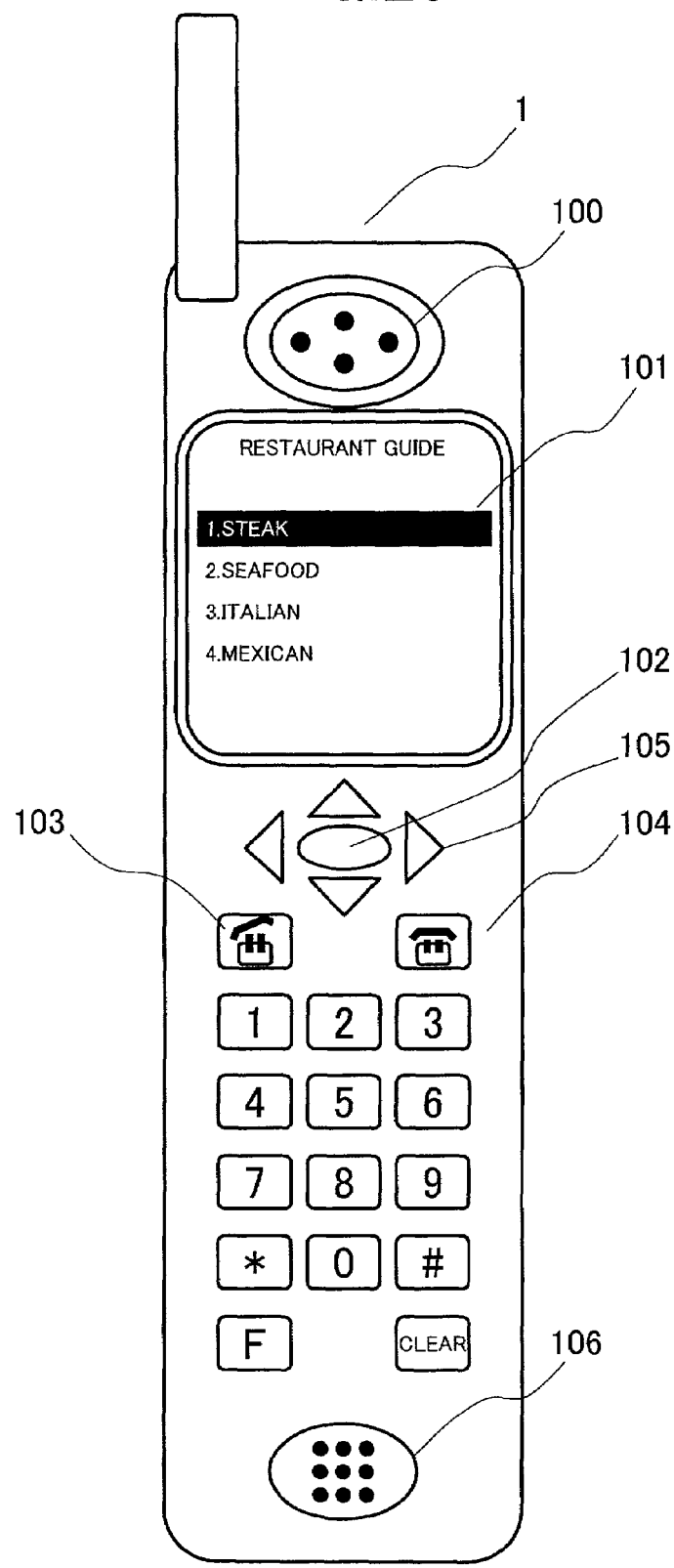
FIG. 29 shows an example of displaying a restaurant category on a display 101 of a telephone terminal display 1.

When the menu item "restaurant guide" is decided, the telephone terminal 1 is connected to the restaurant information system via the mobile internet access service gateway server 3 and displays categories of the restaurant as shown in FIG. 29.

Figure 30:
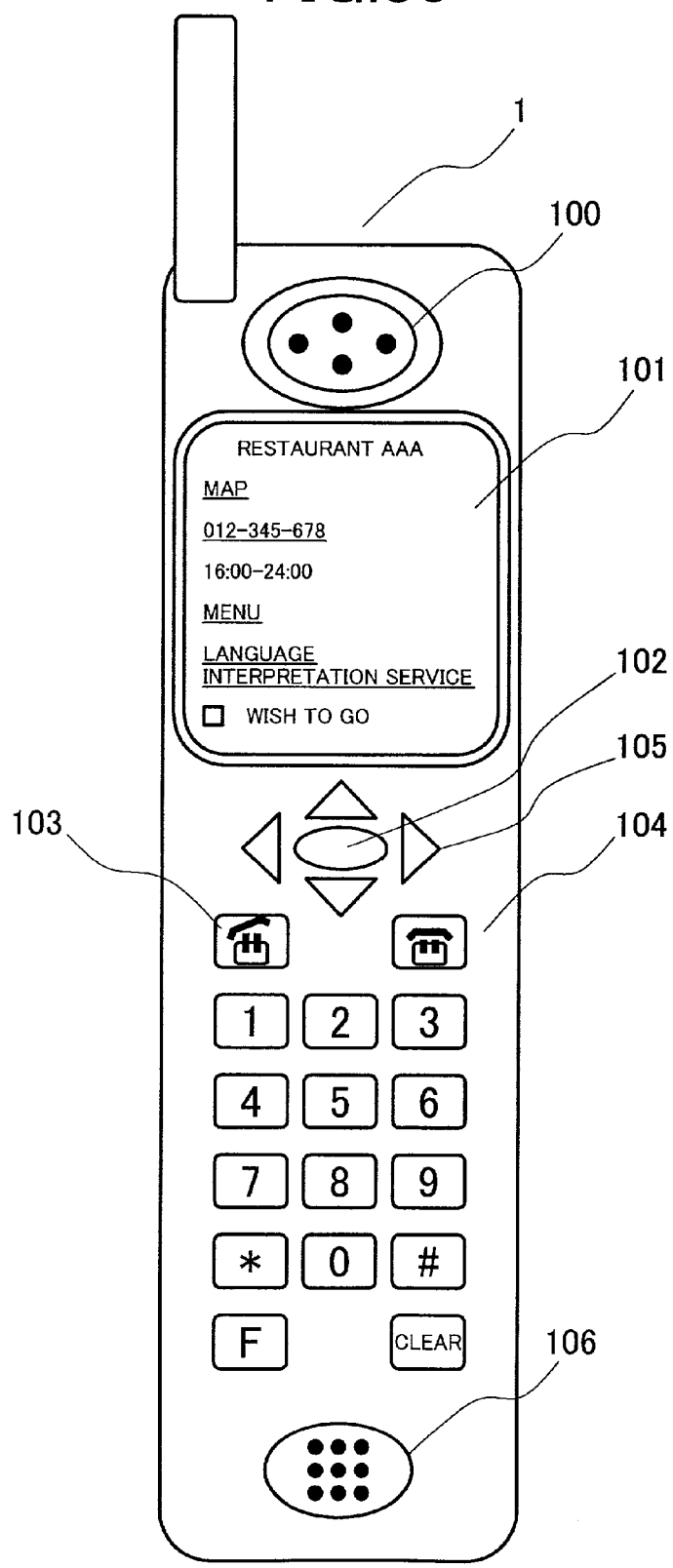
FIG. 30 shows an example of displaying a guide to the restaurant on the display 101 of the telephone terminal display 1.

Selecting "seafood" displays a list of seafood restaurants. Selecting "restaurant AAA" displays information about "restaurant AAA" as shown in FIG. 30. Clicking "language interpretation service" activates the Japanese-English interpretation system.

The interpretation system starts from the state after "restaurant" is selected from the scenes in FIG. 6, and then displays the sentence templates as shown in FIG. 7.

At this time, the interpretation system uses the Japanese-English dictionary for restaurant AAA B14 in addition to the Japanese-English dictionary for each traveler B13.

The interpretation system is not limited to the case where the traveler's profile contains "stone crab" as "interested food". The system can also accurately recognize and translate the sentence "sutoonkurabu wa arimasuka?" for ordering the stone crab, a specialty of the restaurant AAA in which the traveler happened to be interested.

Checking the box "wish to go" on the screen in FIG. 30 stores the restaurant in the traveler's profile B9. When the restaurant guide is accessed next time, the checked restaurant is displayed at the top of the list.

Further, the traveler's Japanese-English dictionary is updated so that this restaurant's Japanese-English dictionary is also referenced for the "restaurant" scene.

When the traveler actually visits the restaurant, her or she can directly access the interpretation service from the screen in FIG. 4 without accessing the restaurant guide. In such a case, the system can also accurately recognize the vocabulary and sentence templates used for that restaurant and translate sentences.

Figure 31:
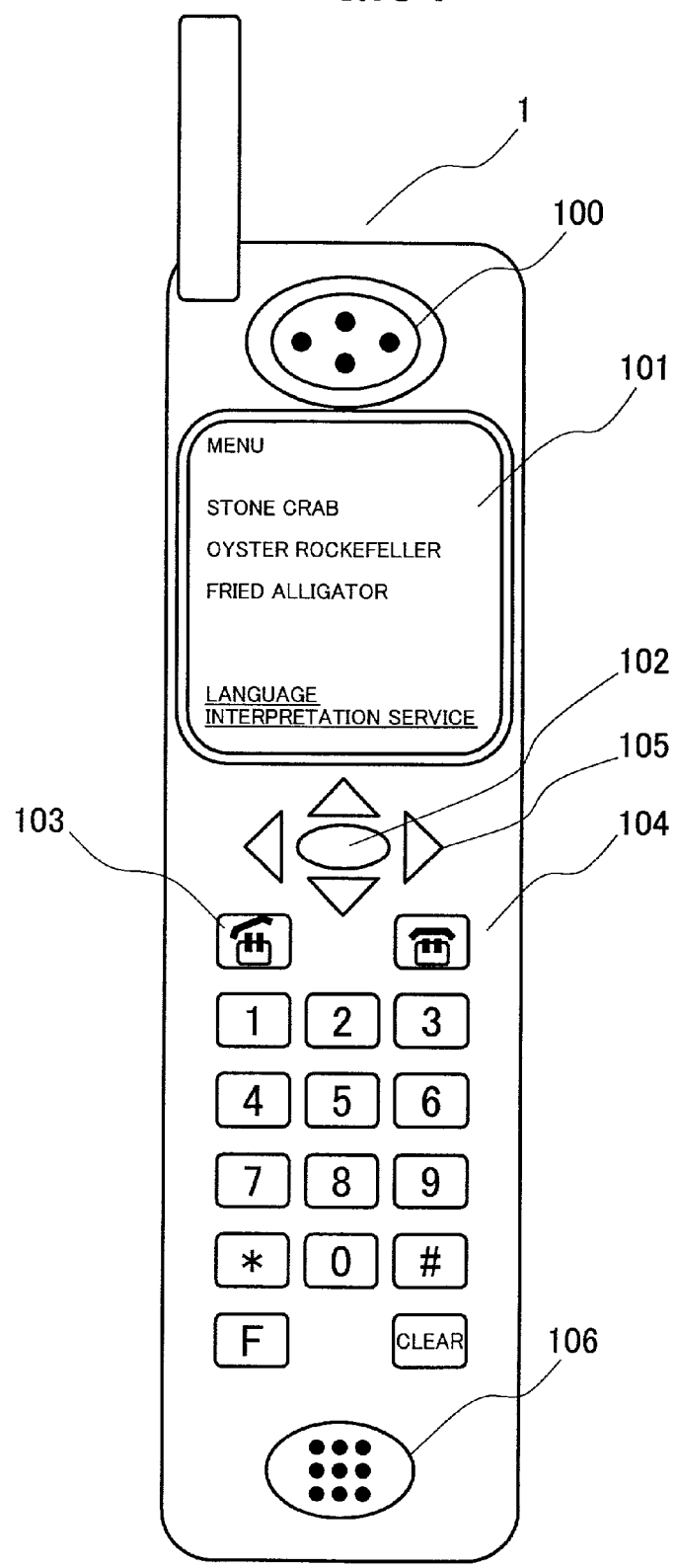
FIG. 31 shows an example of displaying a restaurant menu on the display 101 of the telephone terminal display 1.

Clicking "menu" on the screen in FIG. 30 displays the restaurant menu as shown in FIG. 31.

Since it is possible to activate "language interpretation service" from the menu screen, the traveler can speak by looking at the menu.

The second embodiment changes operations of the accounting server 32 depending on whether the traveler uses the English-Japanese dictionary B14 for the service company such as a restaurant or only his or her own English-Japanese dictionary B13.

More specifically, when the traveler uses the English-Japanese dictionary B14 for the service company such as a restaurant, the system does not charge the traveler (free of charge). Alternatively, the system decreases a charging amount added to the accounting table compared to the amount added when the traveler uses only his or her English-Japanese dictionary B13.

It is also possible to charge users in the same manner as the first embodiment.

As mentioned above, the second embodiment associates the interpretation service with the restaurant guide service. Accordingly, travelers are tempted to visit a restaurant presented in the restaurant guide service, improving the restaurant's ability to pull in more customers.

The similar service can be provided for shops, sightseeing spots, etc. as well as restaurants.

According to the present invention, the user can customize sentence templates by answering a simple menu-based questionnaire. This provides a merit of eliminating user's troubles and mental burden.

The questionnaire is also used for receiving information such as meals, shopping, sightseeing, etc., causing an additional advantageous effect.

The system is designed to provide information about a place corresponding to the "wish to go" check box enabled and register sentence templates used there in the sentence dictionary customized for each user. The user can collect necessary sentence templates while enjoying preparation for the travel.

During travel, the system enables retrieval of information about a specific place (e.g., a restaurant's address, telephone number, business hours, menus) in conjunction with retrieval of sentence templates used there, improving usability. This form of service provision can offer the interpretation service to travelers free of charge by collecting operating funds from restaurants, shops, facilities, etc.

When restaurants, shops, facilities, etc. have user dictionaries, an unregistered traveler can enjoy an accurate interpretation service appropriate for that place, having an effect of attracting customers.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A computer implemented method of customizing a dictionary used for speech recognition, comprising the steps of:

extracting user-specific vocabulary from a set of registered user profile information; and generating a new customized sentence by inserting at least one word in said user-specific vocabulary into a slot of a sentence template stored in a translation database and storing said customized sentence into said dictionary, wherein said customized sentence stored in said dictionary is used for recognizing speech input by a user that is converted into voice data and collated with said customized sentence.

2. A computer implemented method of customizing a dictionary according to claim 1, wherein said set of registered user profile information is generated based on inputted answers to a questionnaire for said user.

3. A computer implemented method of customizing a dictionary according to claim 1, wherein said sentence template includes slot definition information including a category of words that can be inserted in said slot, and said at least one word in said user-specific vocabulary is inserted in said slot according to said slot definition information.

4. A method of customizing a dictionary according to claim 1, wherein said step of storing said customized sentence into said dictionary includes storing said customized sentence as a time series of feature vectors.

5. A method of customizing a dictionary according to claim 1, wherein said step of storing said customized sentence into said dictionary includes storing said customized sentence as a time series of feature vectors and said step of recognizing the input speech by collating said corresponding voice data with said customized sentence includes collating values of a time series of feature vectors of the input speech with the stored time series of feature vectors of the customized sentences in the sentence dictionary.

6. A storage media readable by a computer for storing a customizing program for customizing a dictionary used for speech recognition, said customizing program enabling the computer to perform the steps of:

extracting user-specific vocabulary from a set of registered user profile information; and generating a new customized sentence by inserting at least one word in said user-specific vocabulary in a slot of a sentence template stored in a translation database and storing said customized sentence into said dictionary, wherein said customized sentence stored in said dictionary is used for recognizing speech input by a user that is converted into voice data and collated with said customized sentence.

7. A storage media readable by a computer for storing a customizing program for customizing a dictionary used for speech recognition according to claim 6, wherein said step of storing said customized sentence into said dictionary includes storing said customized sentence as a time series of feature vectors.

8. A storage media readable by a computer for storing a customizing program for customizing a dictionary used for speech recognition according to claim 6, wherein said step of storing said customized sentence into said dictionary includes storing said customized sentence as a time series of feature vectors and said step of recognizing the input speech by collating said corresponding voice data with said customized sentence includes collating values of a time series of feature vectors of the input speech with the stored time series of feature vectors of the customized sentences in the sentence dictionary.

* * * * *